(12) United States Patent
Ozawa et al.

(10) Patent No.: US 6,971,177 B2
(45) Date of Patent: Dec. 6, 2005

(54) WHEEL BEARING DEVICE AND METHOD OF MANUFACTURING THE SAME

(75) Inventors: Masahiro Ozawa, Shizuoka-ken (JP); Koji Sahashi, Shizuoka-ken (JP); Kazuhiko Hozumi, Shizuoka-ken (JP); Keisuke Sone, Shizuoka-ken (JP); Mitsuru Umekida, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/782,836

(22) Filed: Feb. 23, 2004

(65) Prior Publication Data

US 2004/0158988 A1    Aug. 19, 2004

Related U.S. Application Data

(62) Division of application No. 10/024,489, filed on Dec. 21, 2001, now Pat. No. 6,773,165.

(30) Foreign Application Priority Data

Dec. 26, 2000  (JP) .............................. 2000-395618
Feb. 26, 2001  (JP) ................................ 2001-50846

(51) Int. Cl.[7] ............................ B21K 1/40; B21D 53/10
(52) U.S. Cl. ............................. 29/898.062; 29/898.061; 29/898.07; 29/894.361; 29/522.1; 29/523; 403/1; 403/280
(58) Field of Search .................... 29/898.061, 898.062, 29/898.07, 894.361, 522.1, 523; 301/105.1; 384/544, 537, 589; 403/1, 277, 280

(56) References Cited

U.S. PATENT DOCUMENTS

| | | | |
|---|---|---|---|
| 2,275,451 A * | 3/1942 | Maxwell ................. | 29/890.044 |
| 4,179,167 A | 12/1979 | Lura et al. .................... | 308/189 |
| 4,707,034 A | 11/1987 | Gerstner et al. ................ | 301/6 |
| 5,341,559 A * | 8/1994 | Reid et al. ...................... | 29/523 |
| 6,146,022 A | 11/2000 | Sahashi et al. .............. | 384/544 |
| 6,280,096 B1 | 8/2001 | Miyazaki et al. ........... | 384/544 |
| 6,422,758 B1 | 7/2002 | Miyazaki et al. ........... | 384/544 |
| 6,428,214 B2 | 8/2002 | Tajima et al. ............... | 384/544 |
| 6,478,471 B2 | 11/2002 | Ishida et al. ................. | 384/537 |
| 6,491,440 B1 | 12/2002 | Sahashi et al. .............. | 384/544 |
| 6,497,515 B1 * | 12/2002 | Sahashi et al. .............. | 384/544 |
| 6,523,909 B1 | 2/2003 | Nakamura et al. ........ | 301/105.1 |
| 6,524,011 B2 | 2/2003 | Miyazaki et al. ........... | 384/544 |
| 6,574,865 B2 * | 6/2003 | Meeker et al. .......... | 29/894.361 |
| 6,682,225 B2 * | 1/2004 | Sahashi et al. .............. | 384/544 |
| 6,773,165 B2 * | 8/2004 | Ozawa et al. ................ | 384/544 |
| 2003/0210842 A1 * | 11/2003 | Tajima et al. ................ | 384/544 |

* cited by examiner

Primary Examiner—Eric Compton
(74) Attorney, Agent, or Firm—Arent Fox PLLC

(57) ABSTRACT

A wheel bearing device is provided to prevent loosening of a hub ring and an outer joint ring that are fitted together. An irregular portion treated with hardening is formed on a fit face of the hub ring on an inside periphery of which the outer joint member is fitted. A low hardness portion of the outer joint member formed with hardness lower than that of the irregular portion is expanded in diameter to make it bite into the irregular portion. In this way the hub ring and the outer joint ring are unitized together.

12 Claims, 31 Drawing Sheets

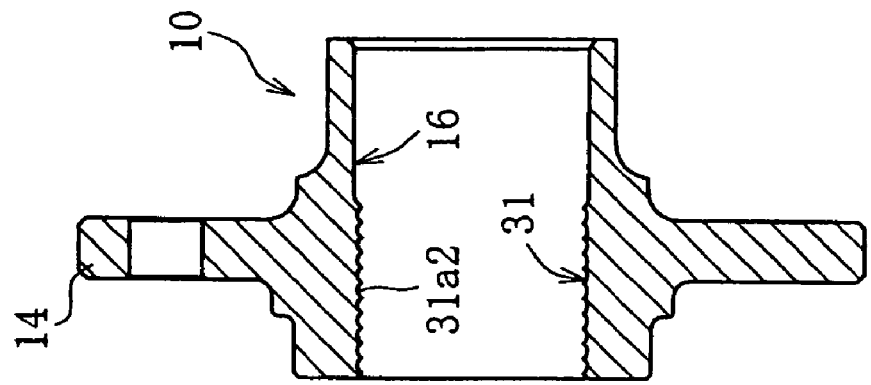
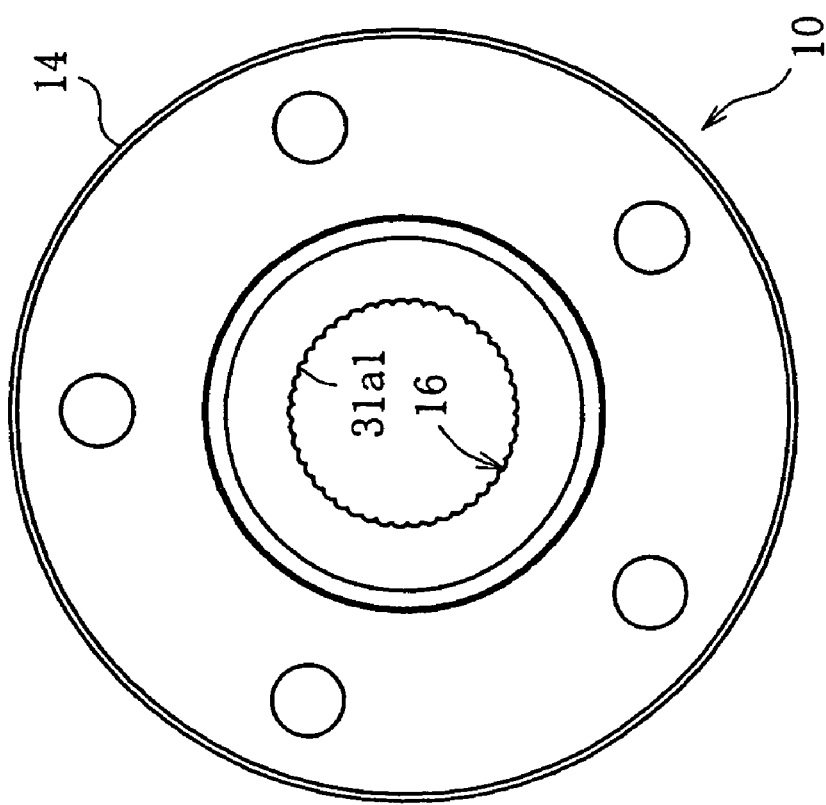

WHEEL BEARING DEVICE AND METHOD OF MANUFACTURING THE SAME

CROSS-REFERENCE TO RELATED APPLICATION

This is a Division of parent application Ser. No. 10/024,489, filed Dec. 21, 2001, now U.S. Pat. No. 6,773,165, which issued on Aug. 10, 2004. The disclosure of the prior application(s) is hereby incorporated by reference in its entirety.

BACKGROUND OF THE INVENTION

1. Field of the Invention

The invention relates to a wheel bearing device for supporting a wheel of an automobile and a method of manufacturing the same.

2. Description of the Related Art

Wheel bearing devices are broadly divided into two categories: those for driving wheels, and those for driven wheels. For example, in a wheel bearing device for driving wheels, as FIG. 33 shows, a hub ring 100, a bearing 200, and a constant velocity universal joint 400 are unitized together. Further, of inner raceways of the bearing 200 in double rows, one of the inner raceways, or an inner raceway 270, is formed at the hub ring 100, and the other inner raceway, or an inner raceway 280, is formed at an outer joint member 410 of the constant velocity universal joint 400.

The hub ring 100 has a flange 140 for supporting a wheel, and the inner raceway 270 is formed at an outside periphery, near the flange 140, of the hub ring 100. The outer joint member 410 of the constant velocity universal joint 400 comprises a mouth portion 460 of a bowl shape and a solid stem portion 450, and is fitted on the hub ring 100 at the stem portion 450 through serration. A shoulder portion 470 of the outer joint member 400 is in contact with an end face of the hub ring 100. The inner raceway 280 is formed at a portion of the outer joint member 410, or at an outside periphery of the mouth portion 460 near the stem portion 450. Outer raceways 240 in double rows facing to the inner raceways 270 and 280 are formed at an inside periphery of an outer member 210 of the bearing 200. Further, rolling members 220 in double rows are assembled between the inner raceways 270 and 280 in double rows and the outer raceways 240 in double rows.

As indicated by numeral 450', an end of the stem portion 450 projecting from the hub ring 100 in an axial direction is bent for swaging to join together the stem portion 450 and the hub ring 100. Further, the outer member 210 is fixed to a suspension device by a fixing portion 230 formed in a flange shape facing outward at an outside periphery of the outer member 210, and a wheel is fixed to the flange 140 of the hub ring 100.

Another example of a wheel bearing device is, as FIG. 34 shows, such that an inner ring 350 is fitted onto a small-diameter cylindrical portion 170 formed at the outside periphery of the hub ring 100. Known as this type of wheel bearing device is such that an end of the small-diameter cylindrical portion 170 of the hub ring 100 projecting from the inner ring 350 in the axial direction is, as denoted by numeral 170', bent for swaging to join together the inner ring 350 and the hub ring 100.

With the wheel bearing device described above, the bearing is generally given with preload, and precise preload control is made when assembling the bearing. In an automobile, however, large moment load is applied to the bearing portion particularly when it turns. Therefore, in a method where an end of the stem portion 450 of the outer joint member 410 (as shown in FIG. 33) or an end of the small-diameter cylindrical portion 170 (as shown in FIG. 34) is bent and swaged, the swaged portion may loosen owing to a reason such as spring-back at the swaged portion, resulting in a possible change in dimension between the inner raceways in double rows and causing loss of preload.

SUMMARY OF THE INVENTION

Therefore, an object of the invention is to prevent loosening at a swaged portion.

Another object of the invention is to provide a method of manufacturing a wheel bearing device that can put preload to the inside of the bearing when swaging for joining, and can easily provide an appropriate amount of preload.

In order to achieve the objects described above, in a wheel bearing device according to the invention, a hub ring, a constant velocity universal joint, and a bearing are unitized together, the hub ring and an outer joint member of the constant velocity universal joint are fitted together, of inner raceways in double rows of the bearing, one of the inner raceways is formed at the hub ring while at the same time the other inner raceway is formed at the outer joint member. Further, a hardened irregular portion is formed at an outside-diameter side member at a fit portion of the hub ring and the outer joint member, and also at the same time, a low hardness portion having a hardness lower than that of the irregular portion is provided at an inside-diameter side member. Then, the low hardness portion is expanded in diameter to make it bite into the irregular portion, so that the hub ring and the outer joint member are unitized together.

When the diameter of the low hardness portion is expanded to make it bite into the irregular portion as described above, joining strength is improved in comparison with conventional swaging made by bending. Consequently, the hub ring and the outer joint member that are fitted together are prevented from loosening, and loss of preload can be avoided.

An effect similar to that described above is obtainable when a hardened irregular portion is provided at the inside-diameter side member. In this case, the irregular portion itself is expanded in diameter to make it bite into a mating face to which the irregular portion is fitted. However, if the irregular portion is excessively hardened, there is fear that swaging cracks occur in a base material of the irregular portion as the diameter is expanded. Therefore, the irregular portion cannot be made too hard; Rockwell hardness (C scale, hereafter as well) of from about HRc 40 to 45 is the limit of the hardness. With such hardness as above, however, the difference in hardness from its mating face of fitting is only about HRc 20 to 25, and therefore the irregular portion may be crushed as it bites into the mating face, causing possible lack in joining strength. As a countermeasure thereto, diameter-expansion allowance (extent of expansion toward an outside-diameter side) of the irregular portion may be increased. In this case, however, when once the irregular portion has bitten into its mating face to a certain depth, the fit portion starts to expands only toward an outside-diameter side afterward without biting into the mating face, thereby producing poor joining force.

On the other hand, when an member (an outside-diameter side member) having the irregular portion as described above and an member (an inside-diameter side member) to be expanded in diameter are arranged as separate members, it is possible to sufficiently harden (to about HRc 60, for example) the irregular portion. With the method described above, the irregular portion is prevented from being crushed in a swaging process and the member to be expanded in diameter can be provided with a low hardness portion having excellent ductility at the same time. Swaging cracks can be prevented from occurring through the expansion of this low hardness portion. Therefore, swaging is made into a deep depth between the hub ring and the outer joint member, so that sufficient joining strength can be secured.

As an embodiment for fitting together the hub ring and the outer joint member, there can be a case where the outside-diameter side member at the fit portion is the hub ring and the inside-diameter side member is the outer joint member (FIG. 1) or a case where the outside-diameter side member at the fit portion is the outer joint member and the inside-diameter side member is the hub ring (FIG. 7).

Further, a wheel bearing device according to the invention comprises a hub ring and a bearing that are unitized together, the hub ring and an inner ring of the bearing are fitted together, and, of inner raceways in double rows of the bearing, one of the inner raceways is formed at the hub ring while at the same time the other inner raceway is formed at the inner ring. In this wheel bearing device, moreover, a hardened irregular portion is formed at an outside-diameter side member at a fit portion of the hub ring and the inner bring, and also at the same time, a low hardness portion having a hardness lower than that of the irregular portion is provided at an inside-diameter side member. The low hardness portion is expanded to make it bite into the irregular portion, and thereby the hub ring and the inner ring are unitized.

In this case as well, the low hardness portion is expanded in diameter to make it bite into the irregular portion. Accordingly, joining strength higher than that obtainable in a conventional swaging method by bending is achieved and loss of preload can be avoided. Further, because the irregular portion and the member that is expanded in diameter are separate members, the low hardness portion having excellent ductility can be provided at the member of which diameter is expanded while the irregular portion is being given sufficient hardness. Therefore, the low hardness portion can be made to deeply bite into the irregular portion.

As an embodiment for fitting the hub ring and the inner ring together, there can be a case where the outside-diameter side member at the fit portion is the inner ring and the inside-diameter side member is the hub ring (FIG. 8).

The wheel bearing device of the present invention can be used for driving wheels when the outer joint member of the constant velocity universal joint is fitted to the inside periphery of the hub ring in a manner in which torque is transmittable (FIG. 19). In this case, a pilot portion that controls a clearance between the inside periphery of the hub ring and an outside periphery of the outer joint member is provided near a line extended from a line forming a contact angle of rolling members rolling on a inner raceway of the inner ring (FIG. 10). This arrangement prevents deformation of the fit portion of the hub ring and the inner ring caused by load acting in a direction of the line that forms the contact angle. As a result, effect such as prevention of breakage of the hub ring and reduction in fretting wear between the hub ring and the inner ring are obtained. Further, deformation of the inner raceway of the inner ring, caused by load in the direction of the line that forms the contact angle, is prevented from occurring, so that effect such as improvement of rolling life can be obtained. To obtain the effects described above, it is preferable that a clearance width of the pilot portion is set at 0.4 mm or less.

When the low hardness portion is expanded in diameter at an inside-diameter side in an area including at least a part of either of the inner raceways, pressing force in a diameter expansion direction acts also on the outside-diameter side member. This pressing force is converted by a contact angle of the rolling members into a component in an axial direction, and the component acts in a direction to tighten the bearing clearance, giving preload to the bearing. In this case, preload control is facilitated because an amount of preload can be directly set at any value by the adjustment of pressing force acting in the diameter-expansion direction.

Hardening of the irregular portion described above is preferably made by a heat treatment using induction heating such as induction quenching (induction heat treatment). An induction heat treatment enables local heating as well as free selection of a depth of a hardened layer. Further, the treatment is advantageous in that it can be controlled so as not to significantly thermally affect areas other than the hardened layer, so that characteristics of a base material is maintained unchanged.

Setting the difference in hardness between the irregular portion and the low hardness portion at HRc 30 or more can securely prevent crushing of the irregular portion at the time of swaging.

Because the irregular portion is formed at an inside periphery of the outside-diameter side member, working the portion with high accuracy is difficult. Therefore, selection of a working method is an essential point. In this case, the irregular portion can be effectively formed with high accuracy with processes including broaching, particularly with helical broaching repeated a plurality of times.

When the irregular portion is formed by grooves in a plurality of rows made to cross each other, fretting wear between the irregular portion and the low hardness portion in the axial direction or circumferential direction can be securely prevented.

The swaging described above is made by a swaging jig having a diameter larger than that of an inside diameter of the inside-diameter side member. At this time, the swaging jig is made to slide on an inside periphery of the inside-diameter side member to expand in diameter the low hardness portion. In this case, the low hardness portion is preferably expanded in diameter by the swaging jig while the inside-diameter side member is being pushed into a direction of reducing an axial bearing clearance. With this method, because pressing force in the axial direction is given to the inside-diameter side member by the swaging jig, the inside-diameter side member and the outside-diameter side member can be joined by swaging while the axial bearing clearance is being reduced. Therefore, a necessary and sufficient amount of preload can be put in a simple process and preload control is facilitated.

Conventionally, as shown in FIG. 35, a stem portion 450 of the outer joint member 410 is first pressed into the inside of the hub ring 100. After that, with a bottom portion of the mouth portion 460 of the outer joint member 410 being supported by a receive member 520, a swaging jig 540, having a larger diameter than an inside diameter of the stem portion 450 of the outer joint member 410, is pressed into the inside of the stem portion 450 in the direction of the arrow to partly expand a diameter of the stem portion 450 (Japanese Patent Laid-Open Publication No. 2001-18605). By doing so, pressing force in the axial direction of the swaging jig 540 is directly supported by the receive member 540 without allowing the pressing force to pass through the hub ring 100 at an outside-diameter side. With this method, however, a clearance T is produced after swaging at a butt portion between an end face of the hub ring 100 and a shoulder face 470 of the outer joint member 410 (see FIG. 36), and the clearance T may cause loss of preload, possibly affecting bearing rigidity or bearing endurance life.

On the other hand, the method according to the invention is, as an example in FIG. 22, a method of manufacturing a wheel bearing device comprising: an outer joint member 21 having outer raceways 24 in double rows on its inside periphery; an inner member 29 having inner raceways 27 and 28 in double rows facing to the outer raceways, an inside-diameter side member 61, and an outside-diameter side member 63 fitted onto the inside-diameter side member with an irregular portion 31 interposed in between; and rolling members 22 in double rows disposed between the outer raceways and inner raceways. With this method, the inside-diameter side member 61 is at least partly expanded in diameter by a swaging jig 54 pushed into the inside of the inside-diameter side member 61, so that the irregular portion 31 bites into its opposing face to join together by swaging the inside-diameter side member 61 and the outside-diameter side member 63. At this time, the inside-diameter side member 61 is expanded in diameter while being pressed by the swaging jig 54 toward axially one side with the inside-diameter side member 61 being made butt against axially the other side of the outside-diameter side member 63 and the outside-diameter side member 63 at the axially one side being supported by the receive member 52.

When the inside-diameter side member 61 is pressed toward the axially one side by the swaging jig 54, the outside-diameter side member 63 butting against the inside-diameter side member 61 is in turn pressed and pushed in to the same direction. In this process, the outside-diameter side member 63 at the axially one side is supported by the receive member 52 and prevented from moving toward the direction of the axially one side. In other words, a pressing force in an axial direction of the swaging jig 54 is received and supported by the receive member 52 after passing through the inside-diameter side member 61 and then the outside-diameter side member 63. Consequently, clearance between both end faces of the inside-diameter side member 61 and the outside-diameter side member 63 is tightened at a butt portion 70 where the two members butt against each other, and compression strain remains at and around the butt portion 70. As a result, a distance L, indicated in FIG. 23(A), between the inner raceways 27 and 28 before the swaging is decreased by an amount of compression strain $\delta$, indicated in FIG. 23(B), after the swaging (to become L-$\delta$). Therefore, through the setting of this $\delta$ at an appropriate value, a desired amount of preload can be given to the bearing with an axial bearing clearance being negative. After swaging, the inside-diameter side member 61 and the outside-diameter side member 63 are solidly joined together without loosening through the biting of the irregular portion 31 into the opposing face 36. Consequently residual compression strain does not disappear and initial preload is steadily maintained for a long period.

In this case, the amount of the compression strain $\delta$ is dependent on a push-in force F of the swaging jig 54 (see FIG. 22) and also on rigidity of the inside-diameter side member 61 and outside-diameter side member 63, or more specifically rigidity at and around the butt portion 70 of both the members 61 and 63. Therefore, preload can be set in a most appropriate range by controlling the push-in force F.

To smoothly carry out the process described above, an outside diameter $\phi$A of the swaging jig 54, an inside diameter $\phi$B of the portion 34 to be swaged of the inside-diameter side member 61, and an inside diameter $\phi$C of the inside-diameter side member 61 excluding the portion 34 to be swaged are set at the relationship of $\phi C > \phi A > \phi B$.

The swaging jig 54 can also be of an expandable/reducible structure. By doing so, even the portion 34 to be swaged located at an opening side of a bottomed cylindrical member (such as the outer joint member 41 blocking a bottom of the mouth portion 46) as shown in FIG. 29 can also be swaged for joining. Specifically, the swaging jig 54 reduced to a diameter which is smaller than an inside diameter of the portion 34 to be swaged is inserted into the inside of the inside-diameter side member 41 (outer joint member) up to a position beyond the portion 34 to be swaged. Then, the swaging jig 54 is expanded in diameter to a dimension larger than that of the portion 34 to be swaged, and then the swaging jig 54 is drawn in the direction opposite to the insertion. Thus, with the same effect as described above, the inside-diameter side member 41 and the outside-diameter side member 10 (hub ring) can be securely swaged for joining.

The swaging jig can be, for example, composed in an expandable/reducible structure by taper-fitting of a divided punch divided in a circumferential direction and an insertion member slidably inserted into the inside of the divided punch.

The inside-diameter side member can be joined by swaging to the outside-diameter side member provided with the inner raceway. It can also be joined by swaging to the outside-diameter side member 71 (see FIG. 32) that is not provided with an inner raceway. In the latter case, deformation of the inner raceway cause by swaging can be prevented from occurring.

The nature, principle, and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 2(A) and 2(B) are a front view and longitudinal cross sectional view, respectively, of a hub ring showing a formation process of an irregular portion;

DETAILED DESCRIPTION OF THE PREFERRED EMBODIMENTS

Embodiments of the invention will be described below referring to FIGS. 1 to 32.

Figure 1:
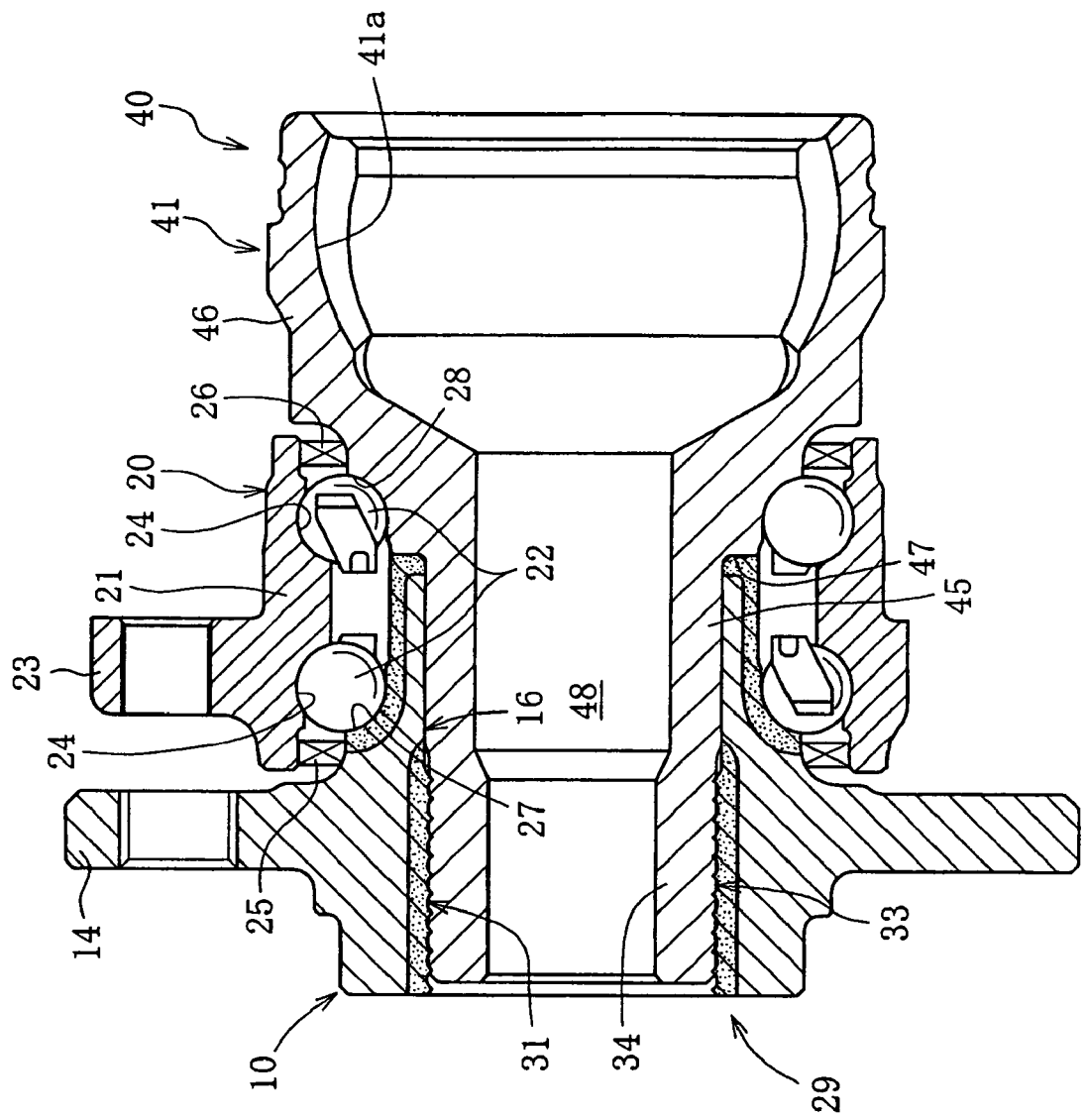
FIG. 1 is a longitudinal cross sectional view of a wheel bearing device according to an embodiment of the invention.

FIG. 1 shows a wheel bearing device for a driving wheel according to the invention. The wheel bearing device is composed of a hub ring 10, a bearing 20, and a constant velocity universal joint 40 in a unitized form. In the description below, a side toward an outside of a vehicle in a state where the wheel bearing device is fixed to the vehicle is called the "outboard side", and a side toward an center of the vehicle is called the "inboard side".

At an outboard end portion of the hub ring 10 is provided with a flange 14 for fixing a wheel (not shown), and hub bolts 15 (see FIGS. 7, 8 and others) are studded at the flange 14 at equal intervals in a circumferential direction for fixing a wheel disk. An outboard inner raceway 27 is formed on an outside periphery of the hub ring 10 at a position more inboard than the flange 14. The hub ring 10 is formed in a hollow shape having a through-hole prepared in an axial direction at its axis portion.

Figure 7:
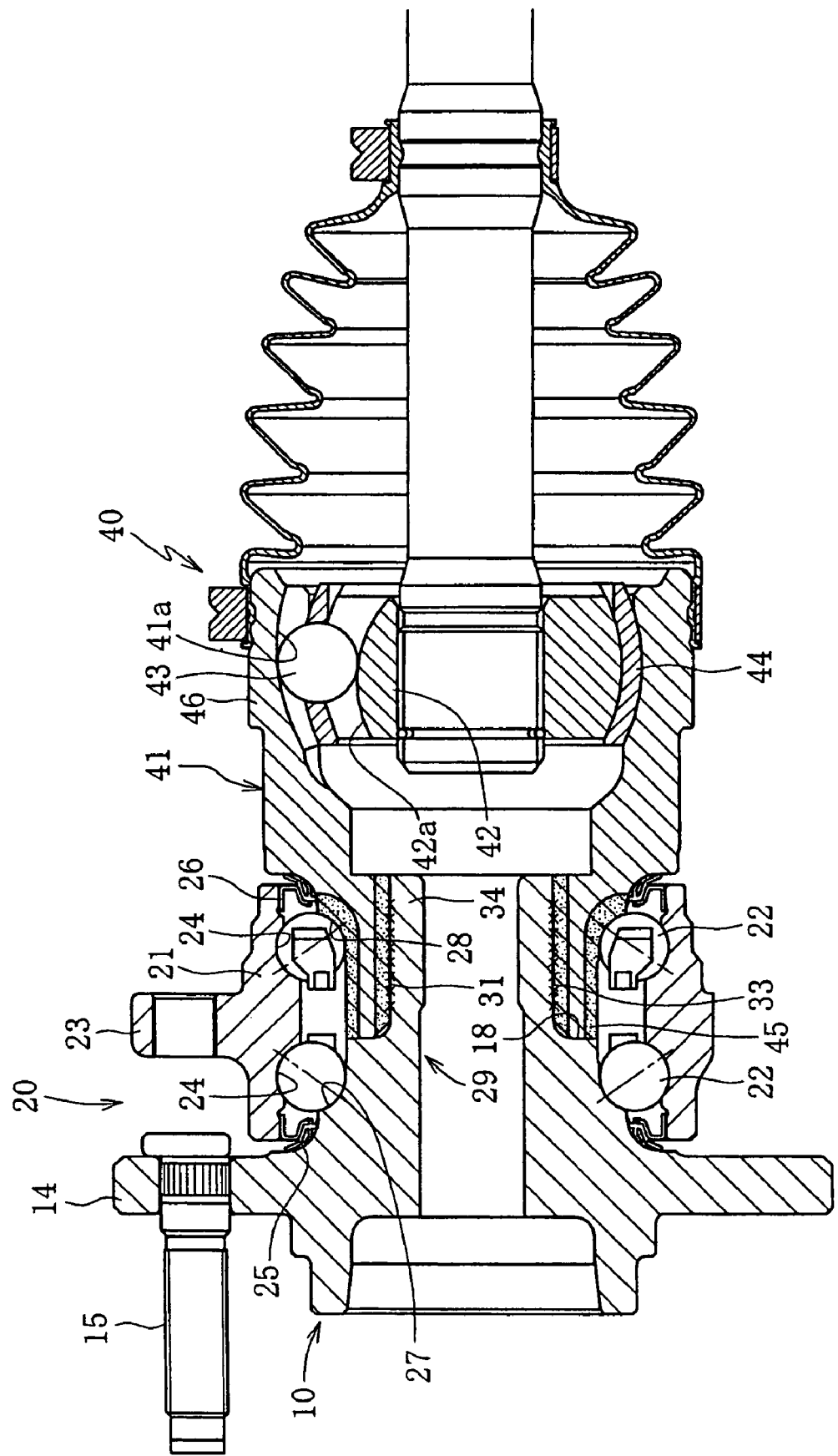
FIG. 7 is a longitudinal cross sectional view showing a wheel bearing device according to another embodiment of the present invention.

The constant velocity universal joint 40 transmits torque from a drive shaft to the outer joint member 41 through an inner joint member 42 and torque transmission balls 43 (see FIG. 7). A plurality of track grooves 41a are formed at an inside periphery of the outer joint member 41. A plurality of ball tracks are formed jointly by the track grooves 41a and a plurality of track grooves 42a provided on an outside periphery of the inner joint member 42, and the constant velocity universal joint 40 is formed by the torque transmission balls 43 disposed at each ball track. Each of the torque transmission balls 43 is retained on the same plane by a cage 44. The outer joint member 41 comprises a stem portion 45 and a mouth portion 46, and is fitted to the inside periphery of the hub ring 10 at the stem portion 45. An inboard-side inner raceway 28 is formed at an outside periphery, at a position near a shoulder face 47, of the mouth portion 46. The shoulder face 47 of the mouth portion 46 contacts an inboard end face of the hub ring 10 to position the hub ring 10 and the outer joint member 41 in the axial direction, and a dimension between the inner raceways 27 and 28 is defined. The stem portion 45 has a hollow shape provided with a through-hole 48 in the axial direction connected with a bottom of the mouth portion 46 of a bowl shape.

The bearing 20 includes an outer member 21 and rolling members 22 in double rows. The outer member 21 is provided with a flange 23 for use in fixation of the bearing device on a vehicle body (not shown) and is formed on its inside periphery with outer raceways 24 in double rows for the rolling members 22 in double rows. The rolling members 22 are assembled between the outer raceways 24 in double rows of the outer member 21 and the inner raceways 27 and 28, in which the inner raceways are provided respectively at the hub ring 10 and the outer joint member 41. Shown in the figure is a case where a double-row angular ball bearing using balls is used as the rolling member 22; however, a double-row conical roller bearing using conical rollers as the rolling members may be adopted for wheel bearing devices for heavy automobiles. Seals 25 and 26 are installed at opening portions of both ends of the outer member 21 to prevent grease filled inside the bearing from leaking and water and foreign matter entering from outside.

An irregular portion 31 with projections and depressions is formed on a fit face 16 at an inside periphery of the hub ring 10. The irregular portion 31 is formed at at least a part of the fit face 16 of the hub ring 10, or, for example, at an outboard end portion of the fit face 16 of the hub ring 10. A part other than the irregular portion 31 of the fit face 16 is formed in a cylindrical shape that close-fits to a cylindrical outside periphery of the stem portion 45.

Projections and depressions of the irregular portion 31 can be of any pattern of a shape. They can be formed, for example, in a screw-thread pattern, a serration (including spline) pattern or a diamond-knurling pattern with grooves in a plurality of parallel rows made to cross each other. Among others, the diamond knurling is particularly effective for preventing fretting wear (particularly, fretting wear in the axial and circumferential directions) after swaging, which will be described below.

Figure 3A:
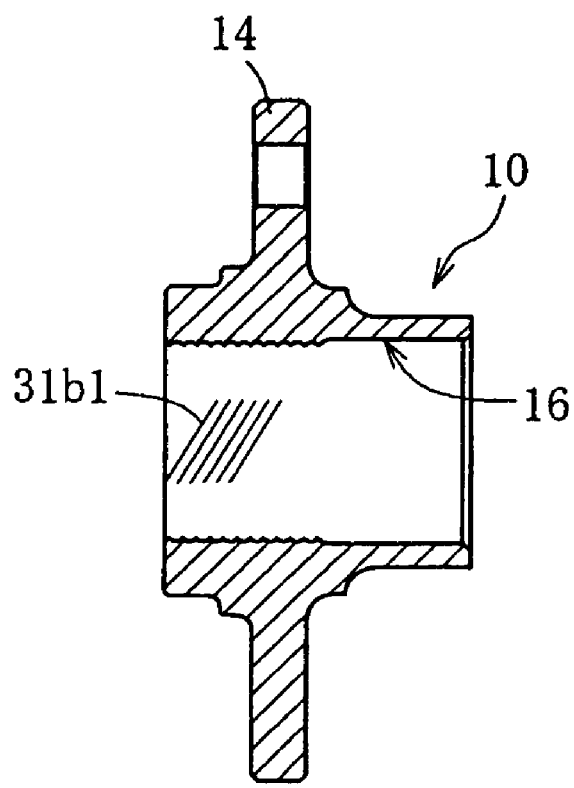
FIGS. 3(A) and 3(B) are longitudinal cross sectional views of a hub ring showing a formation process of an irregular portion.
Figure 3B:
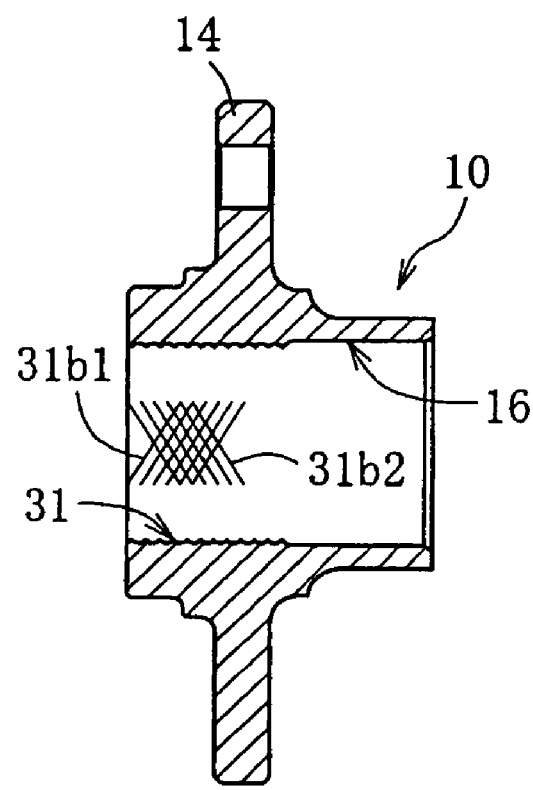

In FIGS. 2(A) and 2(B), the irregular portion 31 having a diamond-knurling pattern is formed by a process including broaching. Specifically, as shown in FIG. 2(A), a plurality of grooves 31a1 in the axial direction are first formed on the fit face 16 at the inside periphery of the hub ring 10. After that, as in FIG. 2(B), a plurality of grooves 31a2 crossing at right angle to the grooves 31a1 are formed by turning in the circumferential direction. The grooves 31a1 in the axial direction and the grooves 31a2 in the circumferential direction may be formed in any order; the grooves 31a2 may be first formed in the order reversed from that described above. Besides, the irregular portion 31 of a diamond-knurling pattern can also be formed by helical broaching applied a plurality of times as shown in FIGS. 3(A) and 3(B). That is, as shown in FIG. 3(A), first helical grooves 31b1 are formed on the fit face 16 at the inside periphery of the hub ring 10 by helical broaching in the axial direction. Then, second helical grooves 31b2 are formed by second helical broaching, applied symmetrically to the first broaching with respect to an axis of the hub ring 10, to finally form the irregular portion 31 of a diamond-knurling pattern.

Figure 4A:
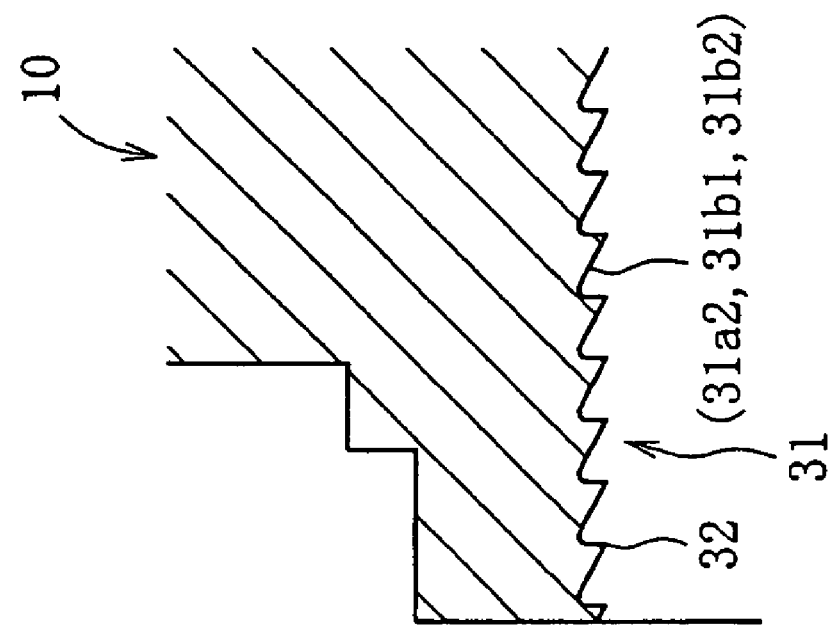
FIGS. 4(A) and 4(B) are enlarged longitudinal cross sectional views of irregular portions.
Figure 4B:
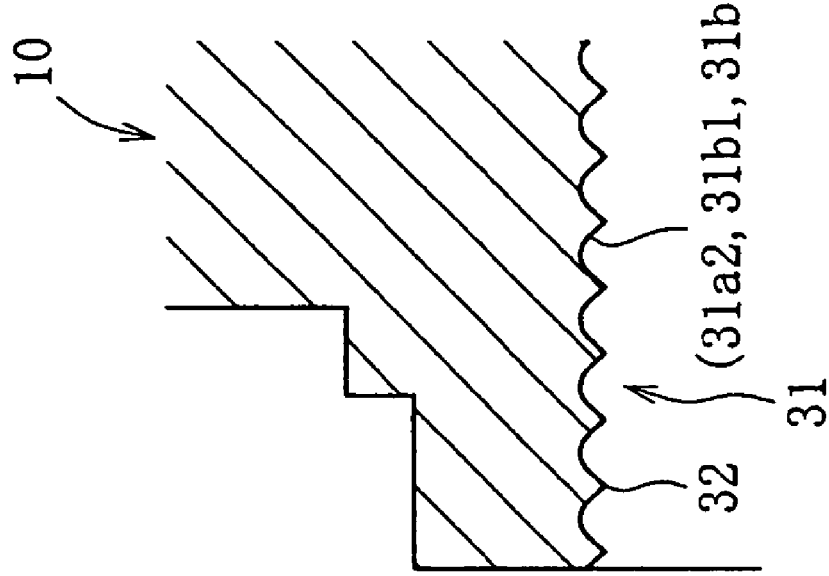

FIGS. 4(A) and 4(B) show enlarged cross sectional views taken in the axial direction of the irregular portion 31 formed in a manner described above. As the figures illustrate, projection portions 32 of the irregular portion 31 are formed in a pointed-end shape to secure excellent bite-in capability, and groove portions 31a2, 31b1, and 31b2 are formed, for example, in a shape of a circular-arc [FIG. 4(A)] or a triangle [FIG. 4(B)] in the cross section.

The irregular portion 31 formed in this way is hardened up to approximately HRc 60 by a heat treatment. Induction quenching is suitable as the heat treatment for this purpose, because it enables local heating, provides free selection of a depth of a hardened layer, and gives less thermal affect to areas other than a hardened layer so that characteristics of a base material can be maintained. A hardened layer created by a heat treatment is formed, as dotted patterns indicate in FIG. 1, not only in an area (inside periphery of the hub ring 10) including the irregular portion 31 of the hub ring 10, but also in an area (outside periphery of the hub ring 10) including the inner raceway 27 of the hub ring 10. When both the hardened layers are interruptedly formed as indicated in the figure, the hub ring 10 is less likely to crack.

As FIG. 1 shows, a low hardness portion 33 having hardness lower than that of the irregular portion 31 is formed at the outside periphery of the stem portion 45 of the outer joint member 41. It is enough if the low hardness portion 33 is formed at, of an outside periphery of the stem portion 45, at least in an area facing to the irregular portion 31, and other areas at the outside periphery of the stem portion 45 may be hardened with a treatment such as a heat treatment. The low hardness portion 33 may be formed as an un-heat-treated portion where a base material is left un-heat-treated through the omission of a heat treatment. Further, it can also be formed by a hardening treatment to harden it to ranges that do not exceed hardness of the irregular portion 31. In this case, the difference in hardness between the irregular portion 31 and the low hardness portion 33 is preferably set to HRc 30 or more. With this arrangement, the irregular portion 31 can smoothly bite into the low hardness portion 33 of the outer joint member 41 without being crushed at the time of swaging.

After the irregular portion 31 is treated for hardening, the stem portion 45 of the outer joint member 41 is fitted to the inside periphery of the hub ring 10. Further, the low hardness portion 33 at the outside periphery of the stem portion 45 is expanded in diameter toward an outside-diameter side from an inside-diameter side. Then, the low hardness portion 33 bites into the irregular portion 31 to plastically join the hub ring 10 and the outer joint member 41 while at the same time a dimension between the inner raceways 27 and 28 is defined and desired preload is put to the inside of the bearing 20. The hub ring 10 and the outer joint member 41, which are plastically joined together, form an inner member 29 having the inner raceways 27 and 28 in double rows.

According to the invention, the low hardness portion 33 of the stem portion 45 bites, when swaged, from a radial direction into the irregular portion 31 at the inside periphery of the hub ring 10. Therefore, more solid joining is obtainable than in a conventional swaging method using bending, and therefore loosening at the swaged portion is prevented. As described above, the irregular portion 31 is not to be easily crushed because of its high hardness. Further, because the low hardness portion 33 expanded in diameter has hardness lower than that of the irregular portion 31 and has excellent ductility, swaging cracks are less likely to occur even larger diameter-expansion allowance is provided at the low hardness portion. Thus, the irregular portion 31 can be made to deeply bite into the low hardness portion 33, and the joining strength of the hub ring 10 and the outer joint member 41 is greatly improved.

Figure 5:
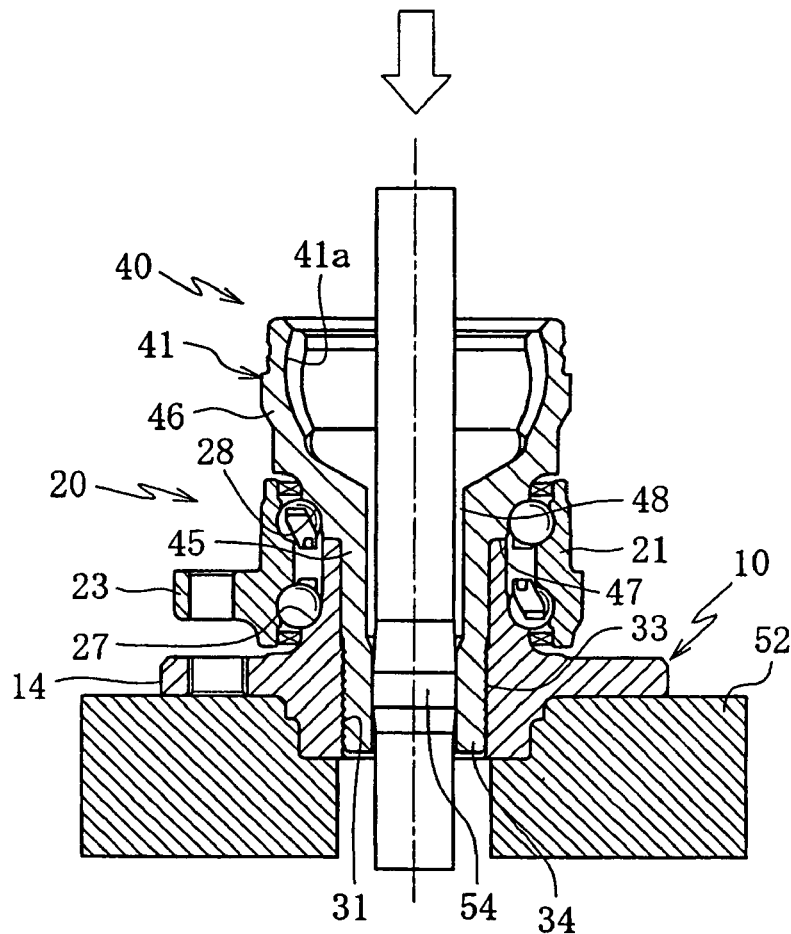
FIG. 5 is a longitudinal cross sectional view showing a swaging process.

Swaging can be made by, for example as shown in FIG. 5, inserting a swaging jig 54 (punch) into a through-hole 48 inside of the stem portion 45 of the outer joint member 41. That is, the stem portion 45 of the outer joint member 41 is first fitted into the inside periphery of the hub ring 10. That is, the swaging jig 54 having an outside diameter larger than an inside diameter of the through-hole 48 of the stem portion 45 is pushed into the through-hole 48 with an end face of the flange 14 of the hub ring 10 being supported by a back-up jig 52 (receive member) and an outboard-side outside diameter portion of the hub ring 10 being restrained in position. Then, the low hardness portion 33 is expanded in diameter to the outside-diameter side from the inside-diameter side. A portion swaged with this diameter expansion, or a portion to be swaged, is indicated with numeral 34.

FIG. 7 shows that, at a fit portion of the hub ring 10 and the outer joint member 41, the hub ring 10 is disposed at an inside-diameter side, oppositely from the case shown in FIG. 1, while at the same time the outer joint member 41 is disposed at an outside-diameter side. In this case, a portion 34 to be swaged is a small-diameter cylindrical portion of the hub ring 10 and is provided at an inside-diameter side of the inboard inner raceway 28. The hardened irregular portion 31 is formed at an inside periphery of the stem portion 45 of the outer joint member 41, and the low hardness portion 33 is formed at the outside periphery of the hub ring 10 facing to the irregular portion 31 (x marks indicate the areas where the irregular portion 31 is formed. So does the same in the description below.). In this case as well, the portion 34 to be swaged of the hub ring 10 is expanded in diameter for swaging from an inside-diameter side toward an outside-diameter side so as to expand a diameter of the low hardness portion 33. Thus the low hardness portion 33 can be made to deeply bite into the irregular portion 31, so that the hub ring 10 and the outer joint member 41 can be firmly joined together.

Hardened layers (indicated with a dotted pattern) prepared by a heat treatment is formed not only at areas (inside periphery of the stem portion 45) including the irregular portion 31, but also formed at areas (outside periphery of the stem portion 45) including the inboard inner raceways 28. In this case, same as the embodiment in FIG. 1, the outer joint member 41 can be made to be less likely to crack when both the hardened layers are interruptedly formed.

Figure 8:
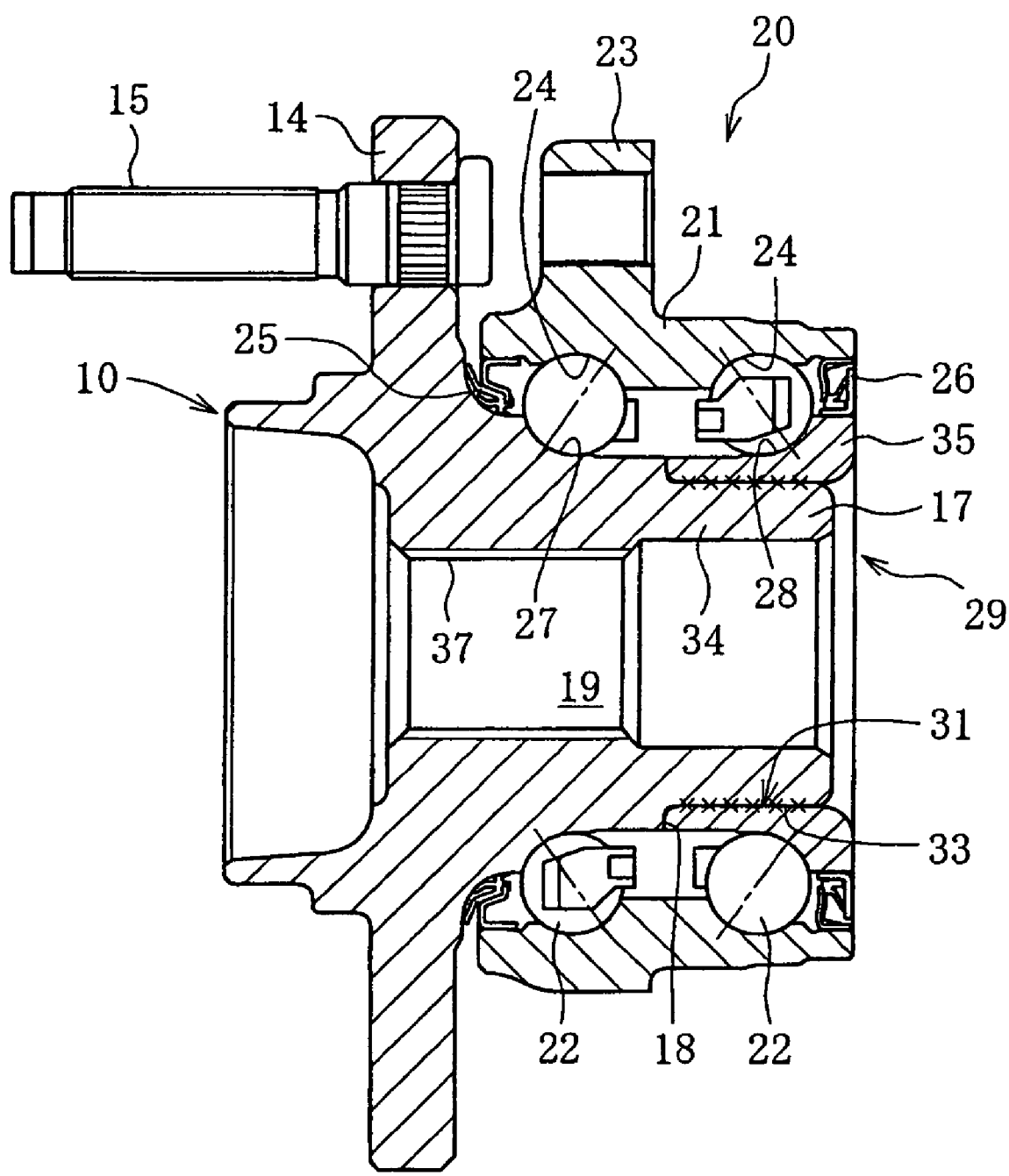
FIG. 8 is a longitudinal cross sectional view showing a wheel bearing device according to another embodiment.

FIG. 8 shows an embodiment where the hub ring 10 and the bearing 20 are unitized together. The hub ring 10 is of a hollow shape having a through-hole 19, and a small-diameter cylindrical portion 17 is formed at an inboard end portion of the hub ring 10. The inner member 29 having the inner raceways 27 and 28 in double rows is formed by fitting an inner ring 35 of the bearing 20 to an outside periphery of the small-diameter cylindrical portion 17. Of the inner raceways 27 and 28 in double rows, the outboard inner raceway 27 is formed at the outside periphery of the hub ring 10 at more inboard than the flange 14, and the inboard inner raceway 28 is formed at an outside periphery of the inner ring 35. An outboard end face of the inner ring 35 contacts the shoulder face 18 of the hub ring 10, thereby defining the dimension between the inner raceways 27 and 28 and giving preload to the inside of the bearing. Shown as an example in the figure are balls having a contact angle (indicated with dash-dotted lines) disposed between the outer raceways 24 and the inner raceways 27 and 28 in double rows.

Figures 9A, 9B, 9C:
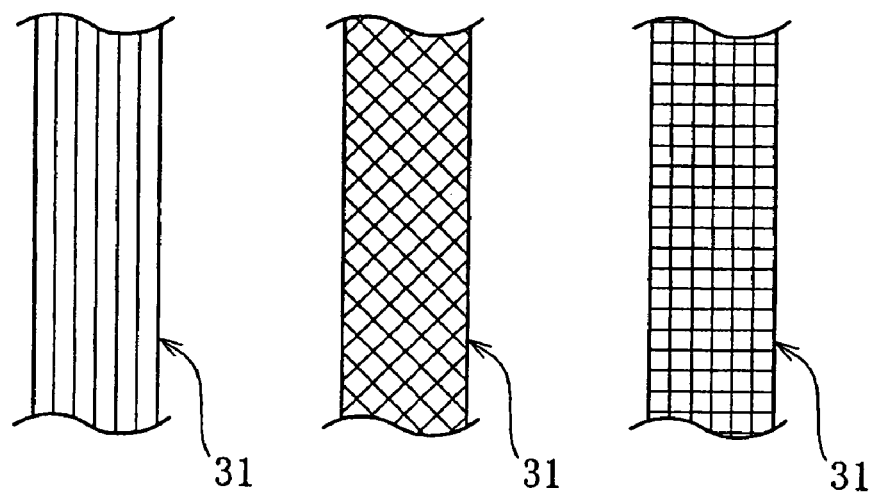
FIGS. 9(A), 9(B), and 9(C) are unfolded plan views of examples of the irregular portion.

The irregular portion 31 and the low hardness portion 33 that are described above are formed at a fit portion of the hub ring 10 and the inner ring 35. More specifically, the irregular portion 31 is formed at an inside periphery of the inner ring 35 located at an outside-diameter side of the fit portion, and the low hardness portion 33 is formed at the outside periphery of the hub ring 10 located at an inside-diameter side of the fit portion. The irregular portion 31 may be formed, for example, only with grooves in a circumferential direction as shown in FIG. 9(A) or may be formed in a diamond-knurling pattern with grooves in a plurality of rows that are made to cross each other at right angles as shown in FIGS. 9(B) and 9(C). FIG. 9(B) shows inclined grooves, and FIG. 9(C) shows grooves in axial and circumferential directions. It may also be formed in a screw-thread pattern or a serration (including spline) pattern besides those described above.

The hardening treatment described above is applied to the irregular portion 31. Further, the low hardness portion 33 is formed by omission of a heat treatment or formed by hardening of the portion for hardness not exceeding the hardness of the irregular portion 31. In this case, the difference in hardness between the irregular portion 31 and the low hardness portion 33 is preferably set to HRc 30 or more. Same as the embodiment in FIG. 1, when the portion 34 to be swaged of the hub ring 10 is swaged for expanding in diameter the low hardness portion 33, the low hardness portion 33 bites into the irregular portion 31. Thus the hub ring 10 and the inner ring 35 are plastically joined as a consequence, preventing loosening at the swaged portion from occurring.

Figure 10:
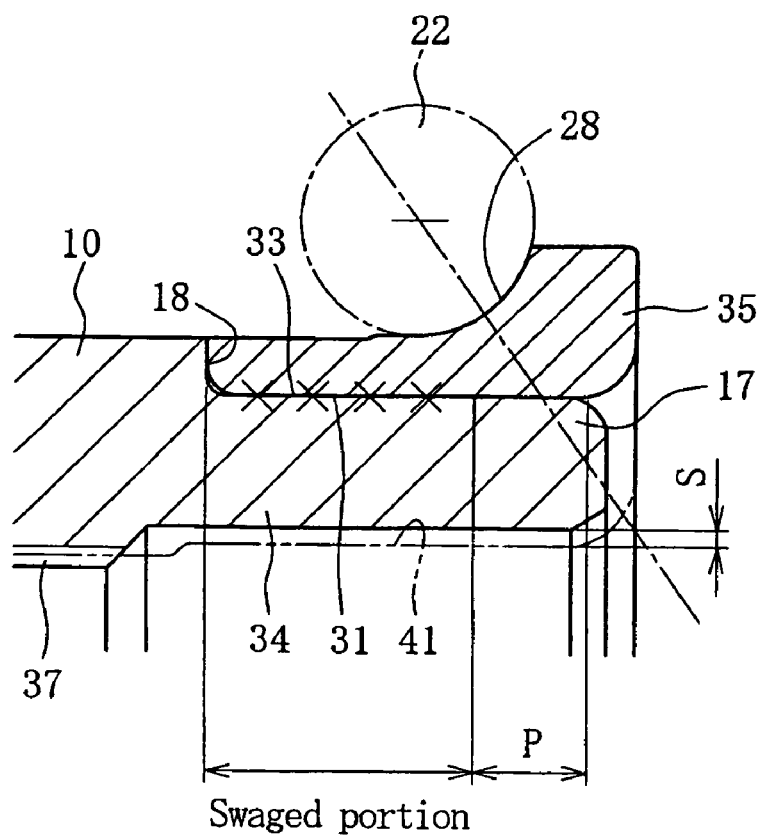
FIG. 10 is an enlarged cross sectional view of an inboard essential part of the wheel bearing device shown in FIG. 8.

In the embodiments in FIGS. 7 and 8, swaging is made at an inside-diameter portion of the inboard inner raceway 28 as shown in FIG. 10 (illustrated corresponding to FIG. 8). When the low hardness portion 33 is expanded in diameter at this position, diameter-expanding force causes a component force in the axial direction (direction from the inboard side toward the outboard side) within the bearing because of a contact angle of the rolling members 22. Therefore, preload can be put to the bearing at the same time when the hub ring 10 and the inner ring 35 are plastically joined. In this case, preload control is facilitated because an amount of preload is directly adjustable through the change of a diameter-expansion force. Swaging is not necessarily made at an inside-diameter side that covers the entire area of the inner raceway 28 as long as solid plastic joining is obtainable and preload can be applied. It is fine in this case if at least a part of the inside-diameter side portion of the inner raceway 28 is included in the area to be swaged.

Figure 11:
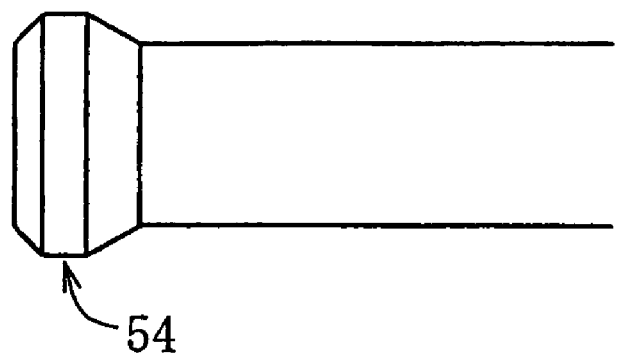
FIG. 11 is a side view of a swaging jig.
Figure 12A:
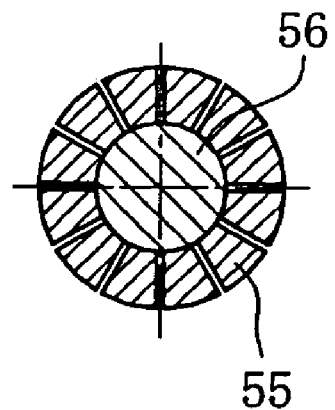
FIGS. 12(A) and 12(B) are a transverse cross sectional view and a side view of a swaging jig, respectively.
Figure 12B:
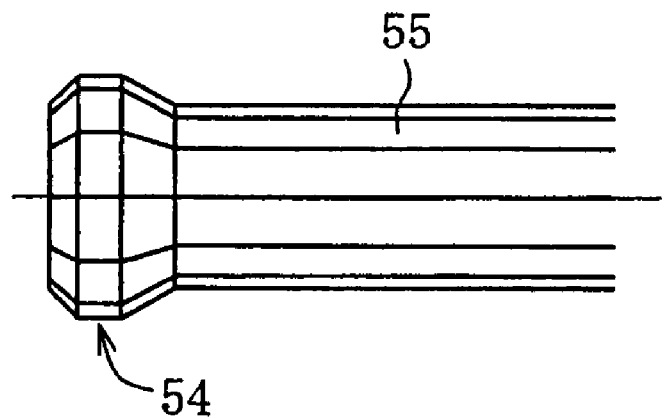
Figure 13:
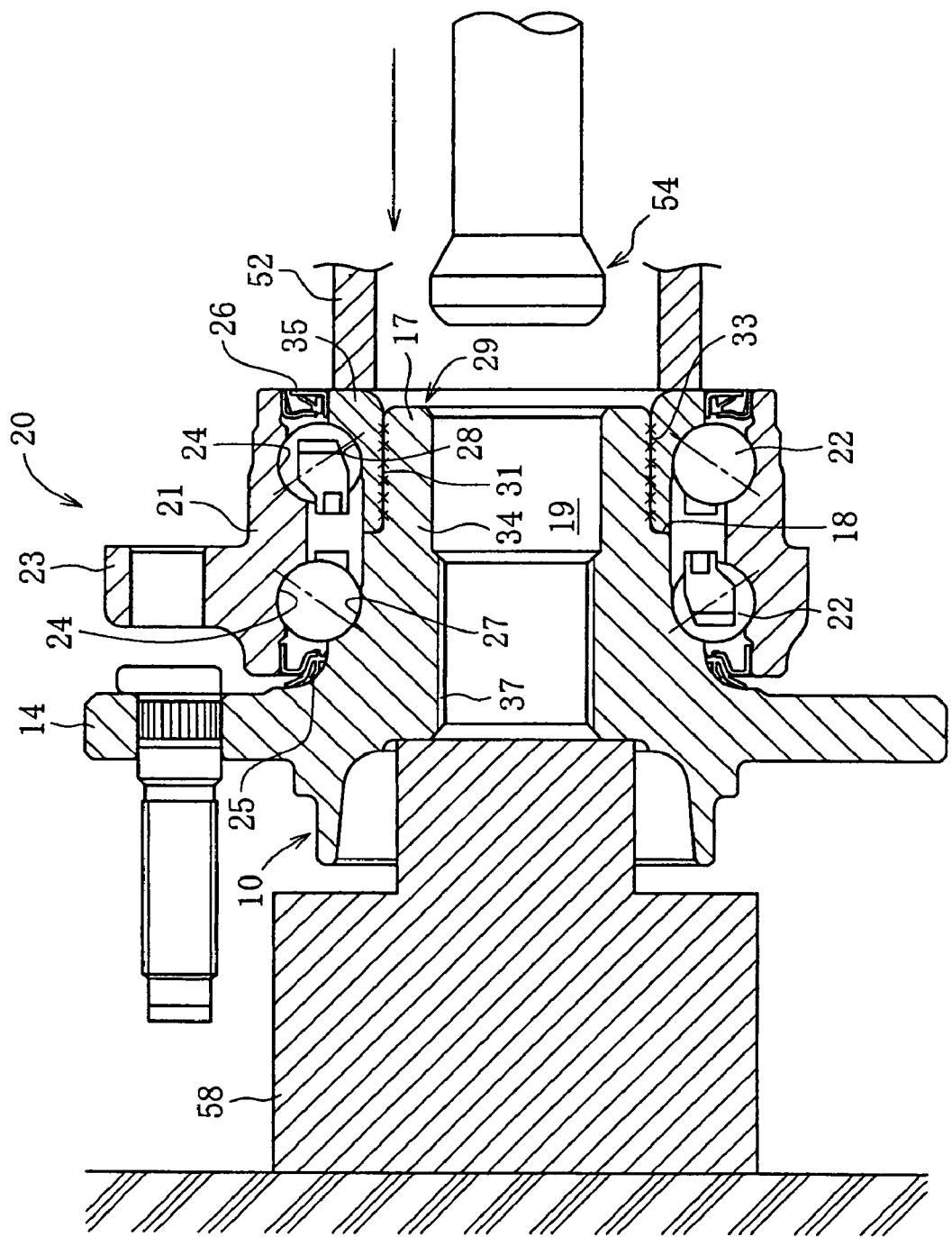
FIG. 13 is a longitudinal cross sectional view showing a swaging process using the swaging jig shown in FIG. 11.
Figure 14:
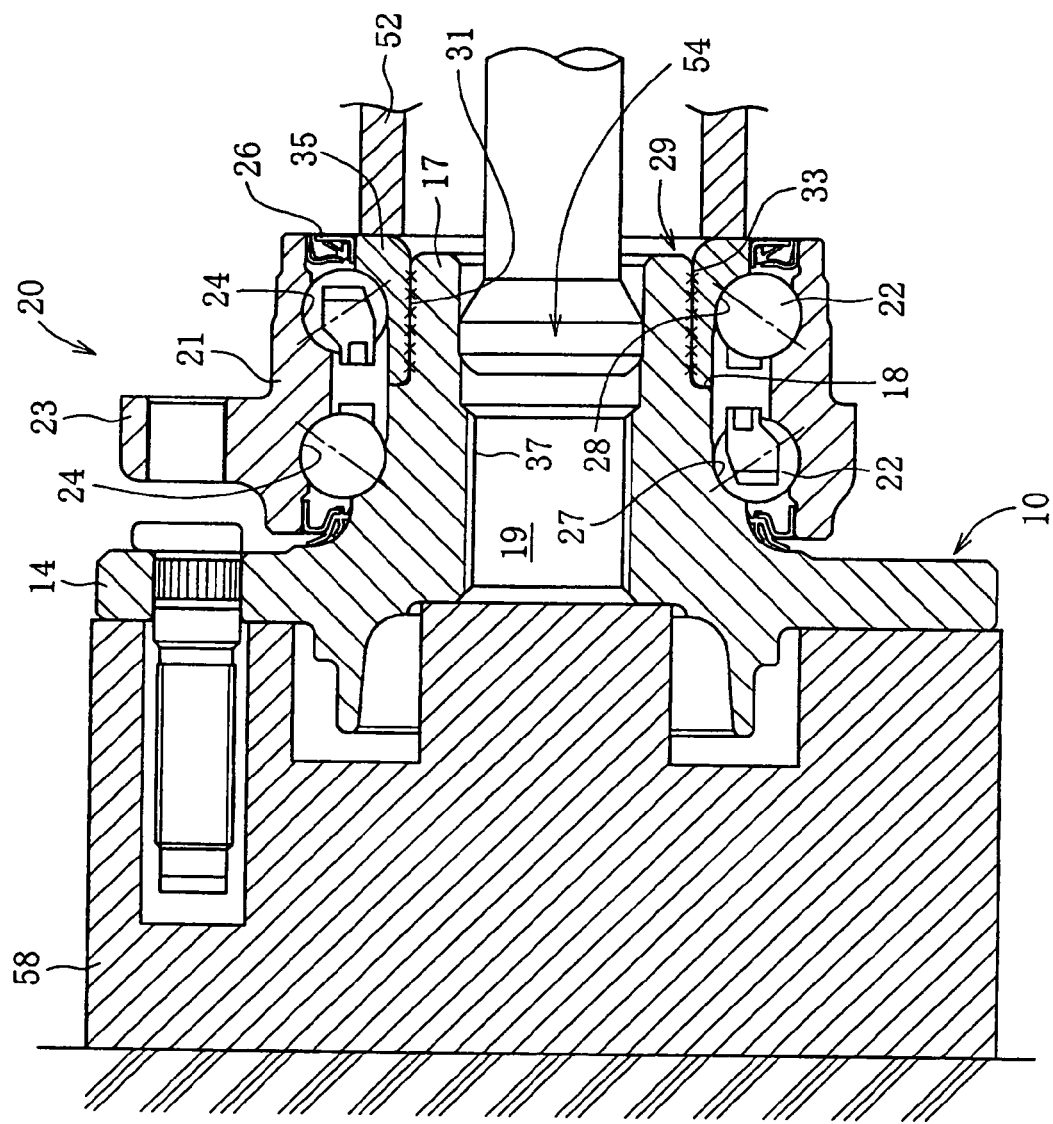
FIG. 14 is a longitudinal cross sectional view showing a swaging process using the swaging jig shown in FIG. 11.

Swaging of the low hardness portion 33 by the expansion of its diameter can be made with the swaging jig 54, having a diameter larger than an inside diameter of the hub ring 10 at the fit portion, made to slide inside the hub ring 10 in the same way as in FIG. 5. FIGS. 11, and 12(A) and 12(B) show examples of the swaging jig 54; FIG. 11 shows the swaging jig 54 having a certain outside-diameter dimension; and FIGS. 12(A) and 12(B), the swaging jig 54 having an adjustable outside diameter. The swaging jig 54 of an adjustable type shown in FIGS. 12(A) and 12(B) has a divided punch 55 divided at a plurality of positions in a circumferential direction, and is expanded or reduced in diameter when a mandrel 56 (insertion member) is inserted into or drawn from its inside.

Figure 15:
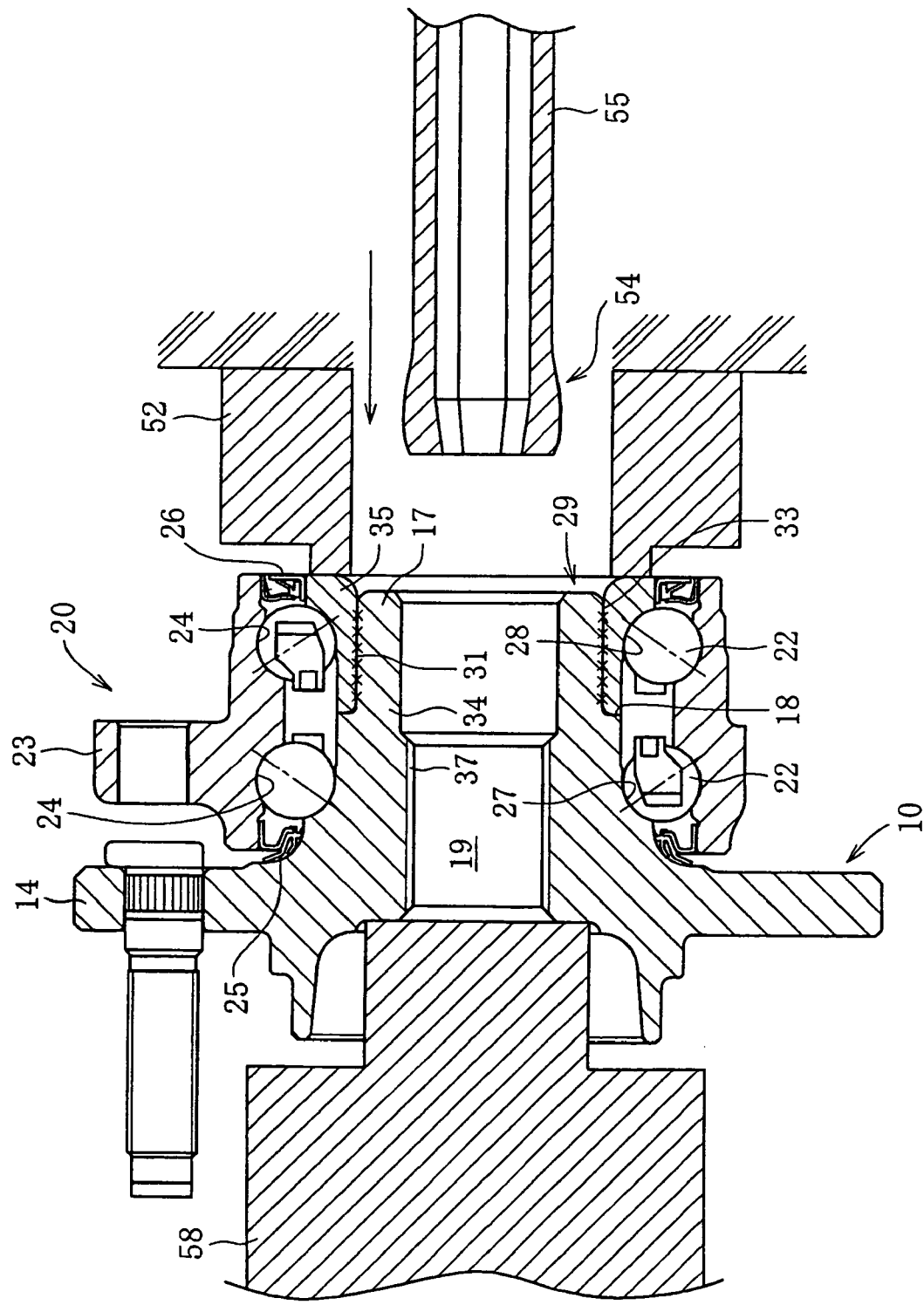
FIG. 15 is a longitudinal cross sectional view showing a swaging process using the swaging jig shown in FIGS. 12(A) and 12(B)
Figure 16:
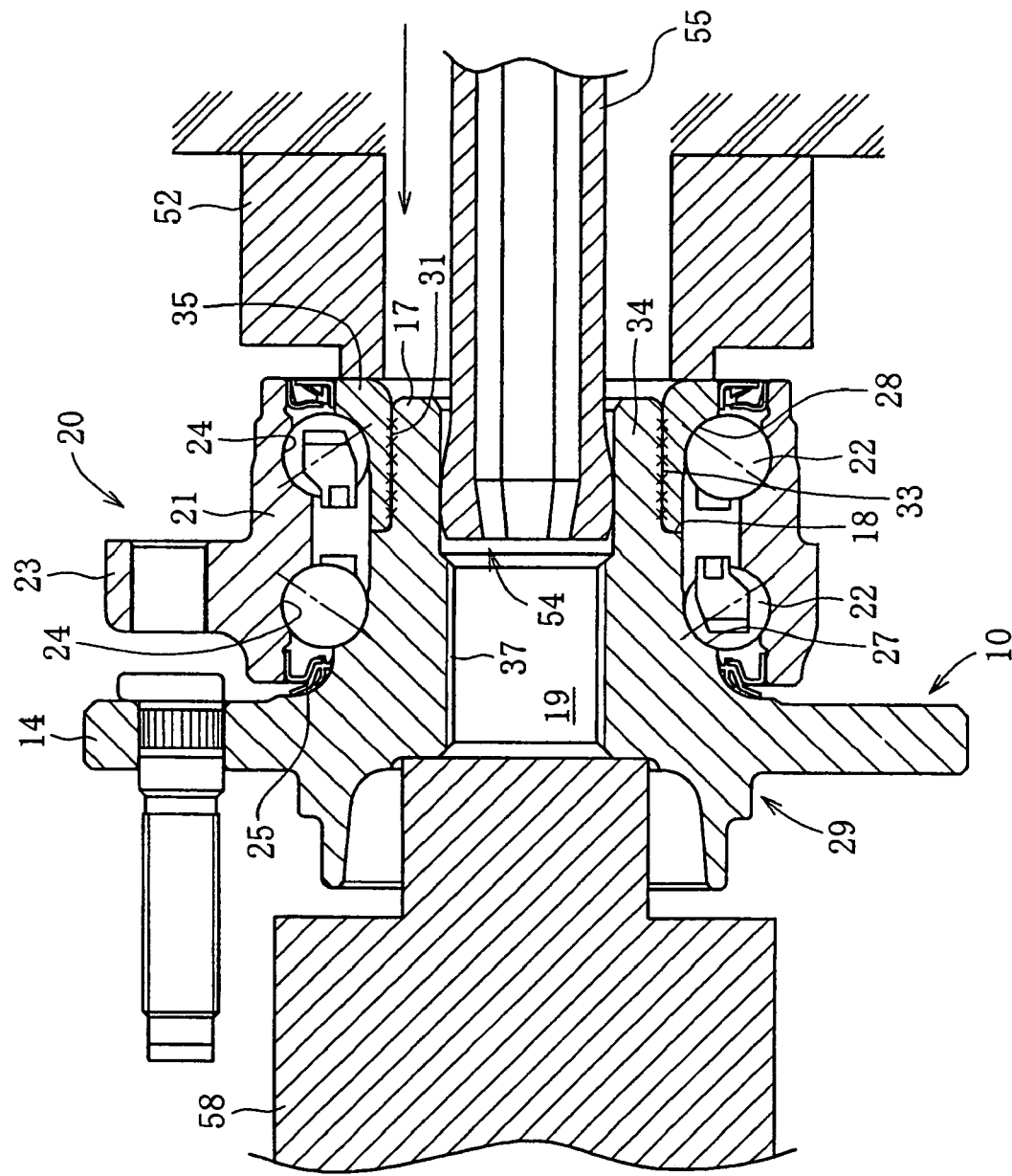
FIG. 16 is a longitudinal cross sectional view showing a swaging process using the swaging jig indicated in FIGS. 12(A) and 12(B)
Figure 17:
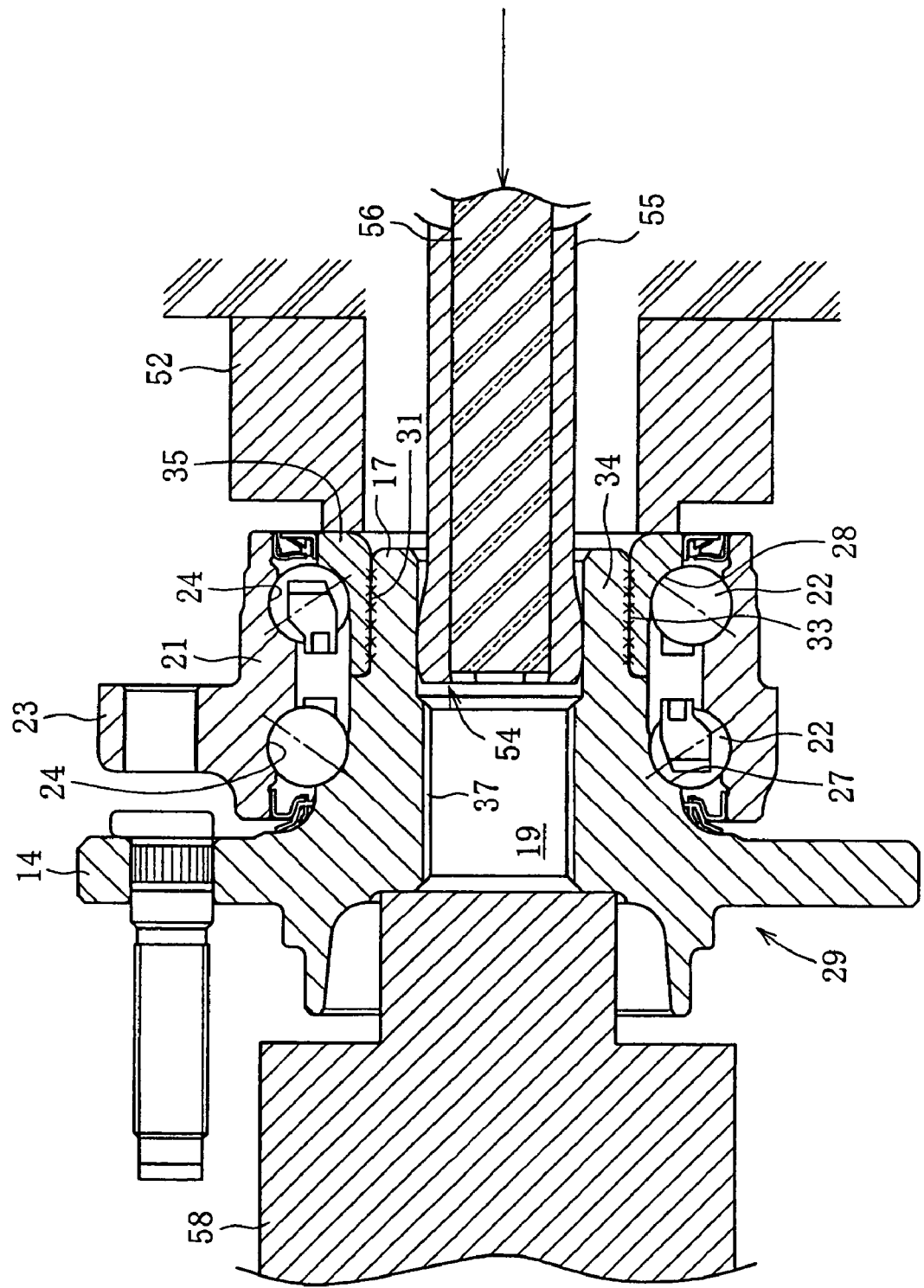
FIG. 17 is a longitudinal cross sectional view showing a swaging process using the swaging jig indicated in FIGS. 12(A) and 12(B)

Swaging by diameter expansion using the swaging jig 54, shown in FIG. 11 is achieved by push of the swaging jig 54 into the through-hole 19 of the hub ring 10 from an inboard end face of the-inner ring 35. At this time, an outboard end face of the hub ring 10 is supported by a support member 58 while the inboard end face of the inner ring 35 is restrained in position by the back-up jig 52. On the other hand, in swaging by diameter expansion using the swaging jig 54 of an adjustable type shown in FIGS. 12(A) and 12(B), the swaging jig 54 with a reduced diameter is first inserted into the through-hole 19 of the hub ring 10 from inboard as shown in FIGS. 15 and 16. Then, as FIG. 17 shows, the mandrel 56 is inserted into the inside of the divided punch 55 to expand in diameter the swaging jig 54 so that an outside periphery of the swaging jig 54 is pressed against an inside periphery of the small-diameter cylindrical portion 17 (portion 34 to be swaged) of the hub ring 10. With this state being held, the swaging jig 54 is drawn out to make swaging. Besides, as shown in FIG. 18, the portion 34 to be swaged can also be swaged by inserting the swaging jig 54 of an adjustable type from outboard into the inside of the hub ring 10.

In the processes shown in FIGS. 13 to 17, the swaging jig 54 can be inserted into the through-hole 19 from inboard. This is enabled because the inside diameter of the small-diameter cylindrical portion 17 (portion 34 to be swaged) is larger than that of the serrated portion 37 formed at an outboard inside periphery of the small-diameter cylindrical portion 17. However, when the inside diameter of the portion 34 to be swaged is smaller than that of the serrated portion 37, the swaging jig 54 shown in FIG. 11 can also be inserted into the inside of the portion 34 to be swaged from outboard for swaging.

Figure 18:
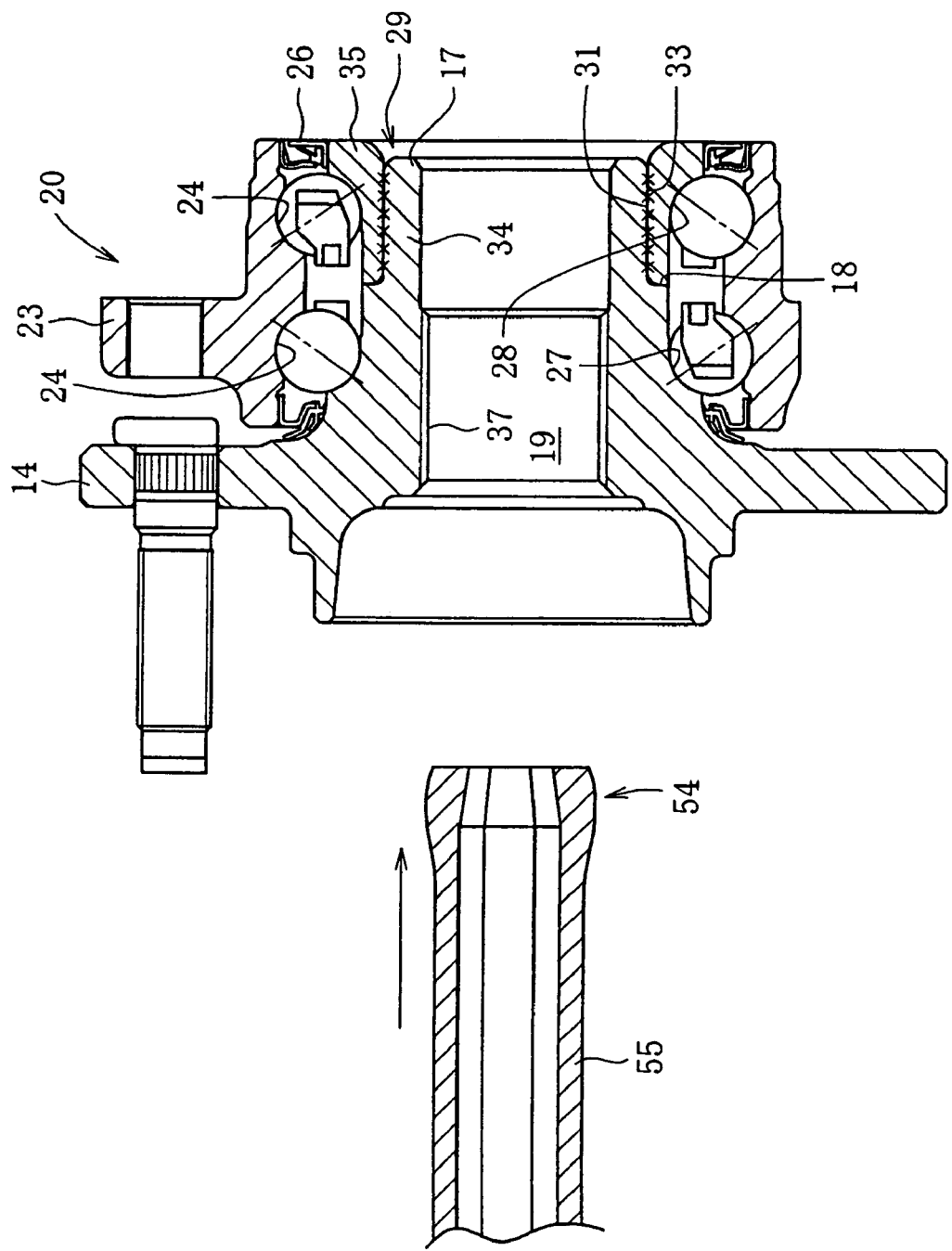
FIG. 18 is a longitudinal cross sectional view showing a swaging process using the swaging jig indicated in FIGS. 12(A) and 12(B)
Figure 19:
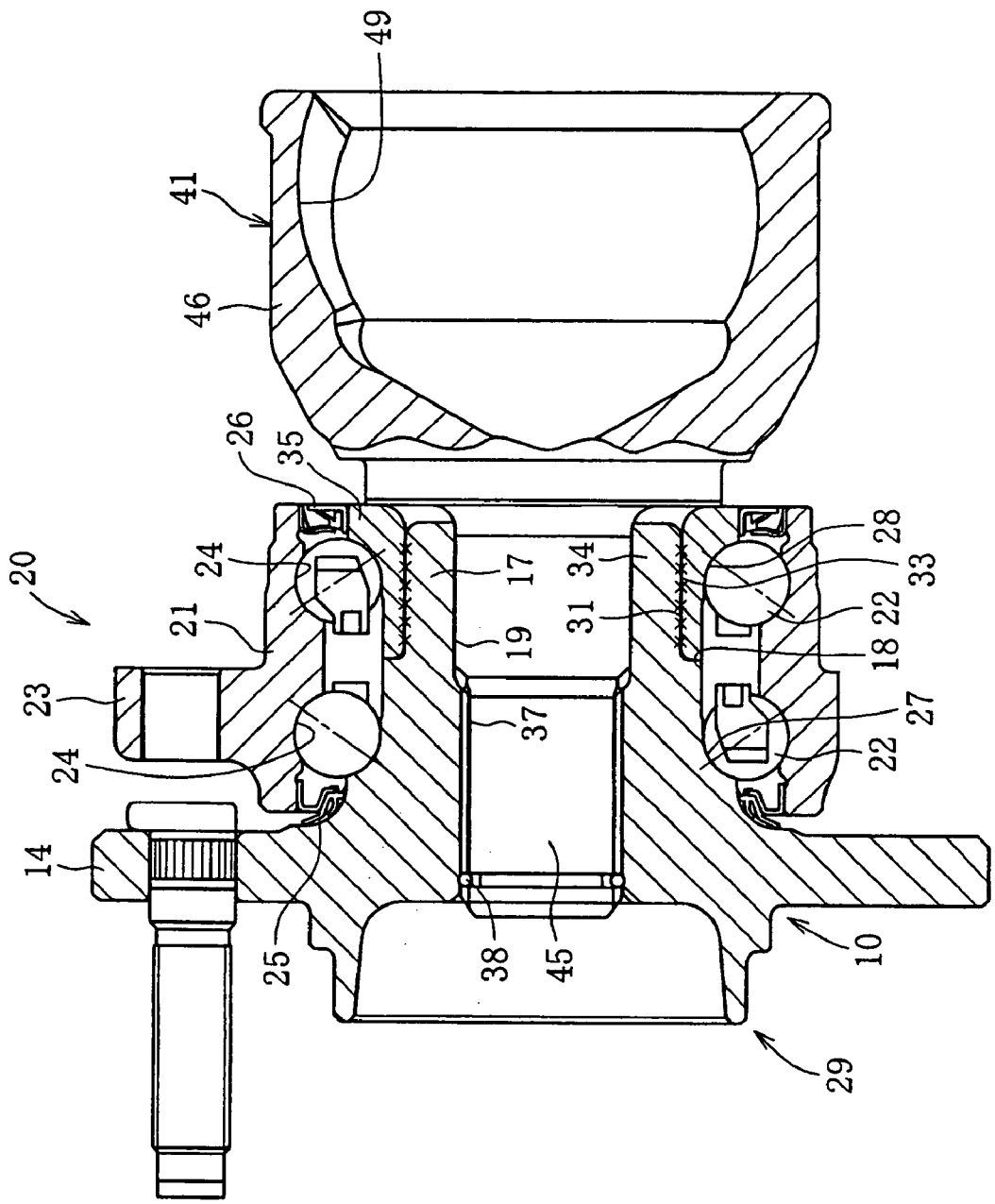
FIG. 19 is a longitudinal cross sectional view of a wheel bearing device with an outer joint member assembled thereto.
Figure 20:
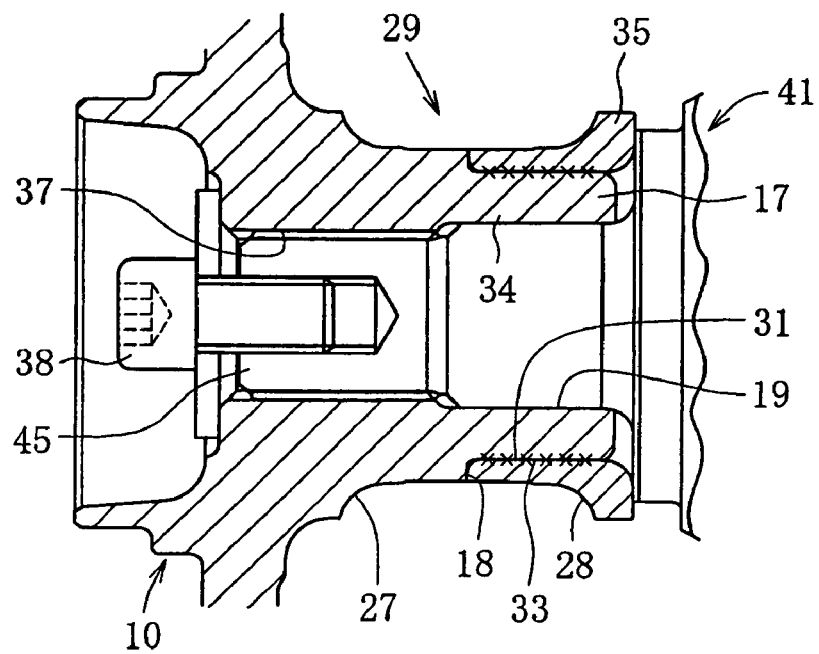
FIG. 20 is a longitudinal cross sectional view of another embodiment of loosening prevention means.
Figure 21:
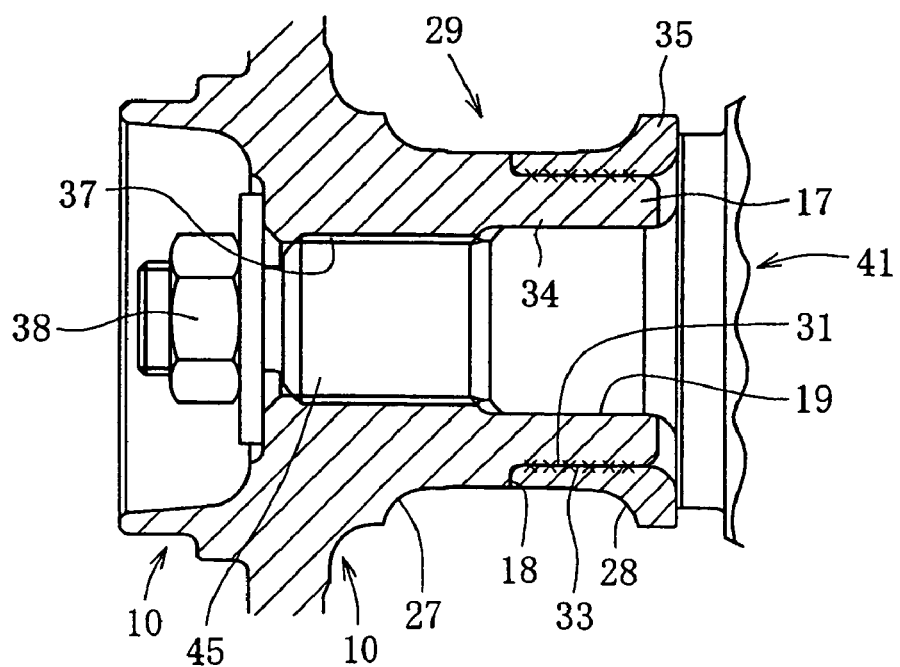
FIG. 21 is a longitudinal cross sectional view of still another embodiment of loosening prevention means.

In wheel bearing devices shown in FIGS. 8 and 18, the outer joint member 41 of the constant velocity universal joint 40 is inserted into the inside of the hub ring 10 as shown in FIG. 19. More specifically, the stem portion 45 of the outer joint member 41 is inserted into the through-hole 19 of the hub ring 10 and the serrated portion 37 formed at the inside periphery of the hub ring 10 and a serrated portion (numeral not given) formed at the outside periphery of the stem portion 45 are fitted together. Thus the hub ring 10 and the outer joint member 41 are joined together in a manner where torque is transmittable. In this type of wheel bearing device, as described above, both loosening prevention and preload control of the inner ring 35 are provided by swaging through expansion in diameter of the low hardness portion 33. Therefore, it is enough to fix the outer joint member 41 to the hub ring 10 by simple loosening prevention means 38 such as a circlip that is enough and sufficient to prevent the hub ring 10 from loosening. A socket-head bolt shown in FIG. 20 or a nut shown in FIG. 21 may be used as other loosening prevention means 38.

As shown in FIG. 10, a pilot portion P is formed near a line extended from a line (indicated with a dash-dotted line) forming a contact angle of the inboard rolling members 22. The pilot portion P functions to make close-fit together the outside periphery of the hub ring 10 and the inside periphery of the inner ring 35, while it functions to limit a clearance S in a radial direction between the inside periphery of the hub ring 10 and the outside periphery of the outer joint member 41 below a certain value. A large clearance at a fit face between the outside periphery of the hub ring 10 and the inside periphery of the hub ring 35 may cause fretting wear between the hub ring 10 and the inner ring 35. However, fretting wear between the hub ring 10 and the inner ring 35 is reduced when the outside periphery of the hub ring 10 and the inside periphery of the inner ring 35 are close-fitted together. Also, when a clearance S between the inside periphery of the hub ring 10 and the outside periphery of the outer joint member 41 is excessively large, loads in the direction of a line forming a contact angle may deform the small-diameter cylindrical portion 17 of the hub ring 10, and further deforms-the inner raceway 28. This in turn may cause harmful effects such as fretting wear between the hub ring 10 and the inner ring 35, decreased rolling life and rise in temperature of the inner raceway 28. As described above, however, with the clearance S of the pilot portion P limited below a certain value, this kind of deformation by loads in the direction of a line forming a contact angle can be prevented and life of a wheel bearing device is improved. In order to obtain the effect described above, the clearance S of the pilot portion is preferably set to 0.4 mm or less.

Further, when the inside periphery of the hub ring 10 and the outside periphery of the outer joint member 41 are closed-fitted together to make the clearance S between them "zero," relative run-out between the outer joint member 41 and the hub ring 10 caused by the clearance S in the rotation of the hub ring 10 is prevented from occurring. This close-fit can be realized depending on the direction in which the outer joint member 41 having an outside diameter larger than the inside diameter of the hub ring 10 is inserted into the inside of the hub ring 10.

Figure 24:
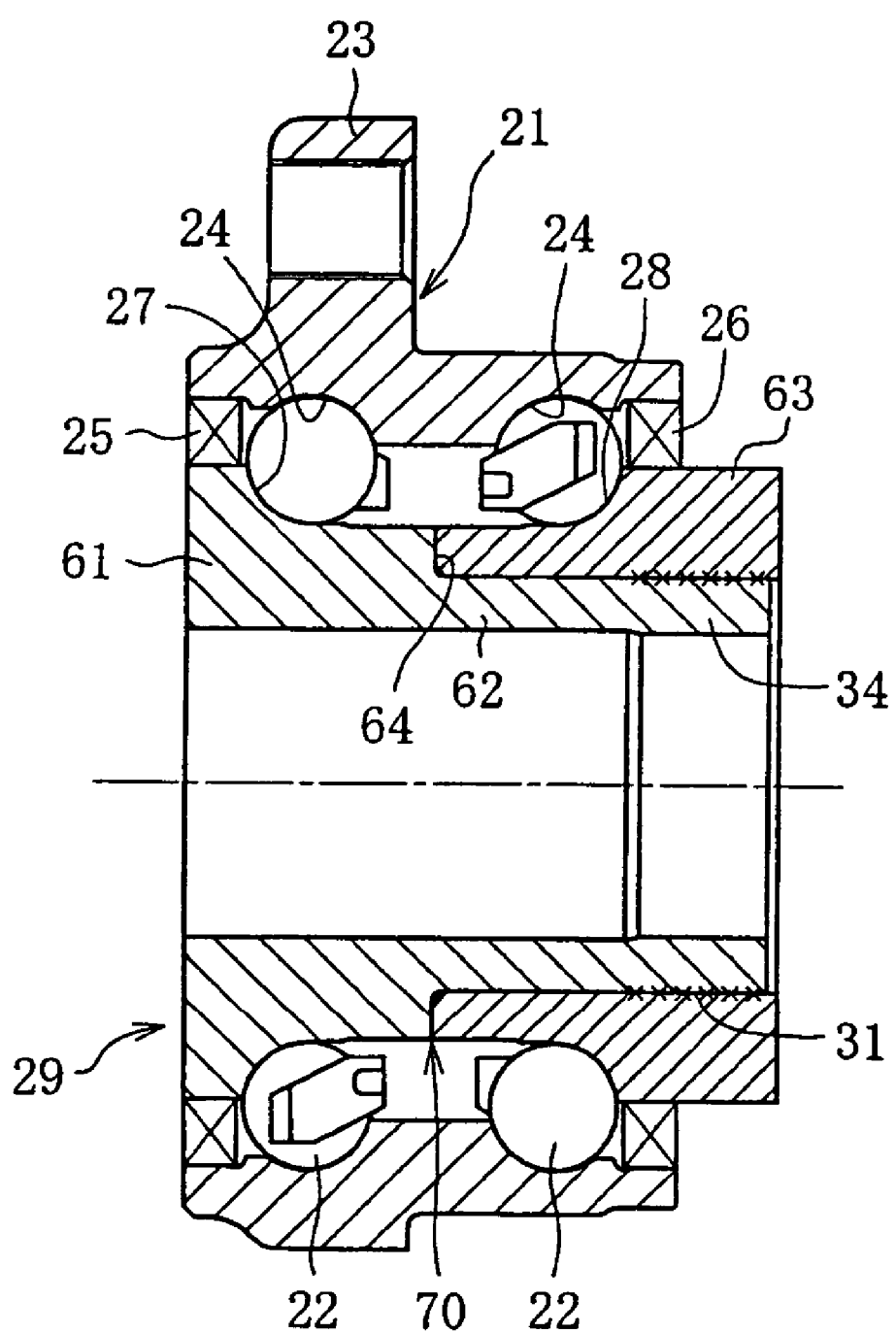
FIG. 24 is a longitudinal cross sectional view of a wheel bearing device.

The wheel bearing device shown in FIG. 24 is composed of an outer member 21 having the outer raceways 24 in double rows at its inside periphery, an inner member 29 having at its outside periphery the inner raceways 27 and 28 in double rows disposed at the inside diameter side of the outer member 21 and facing to the outer raceways 24, and the rolling members 22 in double rows disposed between the outer raceways 24 and the inner raceways 27 and 28. Formed at the outer member 21 is the flange 23,to be fixed to a wheel or a vehicle body (FIG. 24 shows an example when the flange 23 is fixed to a vehicle body side.).

The inner member 29 shown in the figure as an example is composed of a first inner ring 61 having the outboard inner raceway 27 and a second inner ring 63 having the inboard inner raceway 28. An inboard portion of the first inner ring 61 is formed in a small-diameter cylindrical shape, and the second inner ring 63 is fitted onto this. small-diameter cylindrical portion 62. Accordingly, in this embodiment, the first inner ring 61 is an inside-diameter side member and the second inner ring 63 is an outside diameter side member at the fit portion.

Figure 25:
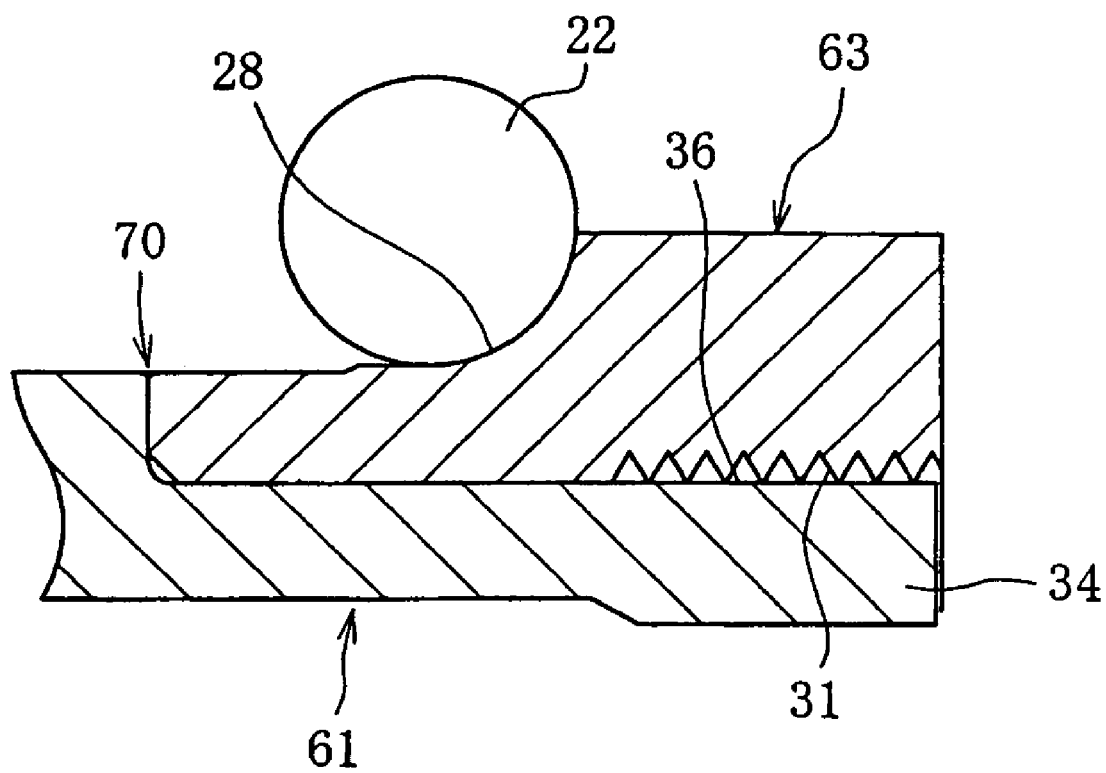
FIG. 25 is an enlarged longitudinal cross sectional view of an essential part shown in FIG. 24.

Both the inner rings 61 and 63 are joined by swaging that is made by the expansion in diameter of the portion 34 to be swaged located at an inboard end portion of the small-diameter cylindrical portion 62. The irregular portion 31 is disposed at the fit portion of the first inner ring 61 and the second inner ring 63. Therefore, when the diameter of the portion 34 to be swaged is expanded, the irregular portion 31 bites into an opposing face 36 so as to join both inner rings 24 and 25 by swaging in a manner where torque is transmittable. At this time, the irregular portion 31 is preferably formed on the inside periphery of the second inner ring 63 and is treated for hardening as shown in FIG. 25 so that swaging cracks are prevented from being produced and that bite-in capability is improved. In this case, the outside periphery of the first inner ring 61 facing to the irregular portion 31 is made as a low hardness portion with hardness lower than that of the irregular portion 31. When no particular problem exists, the irregular portion 31 may be formed on the outside periphery of the first inner ring 61.

In this embodiment, differently from that shown in FIG. 8, them portion 34 to be swaged of the first inner ring 61 is formed in areas outside the inside-diameter portion of the inner raceways 27 and 28, or, as illustrated in the figure, at more inboard than the inboard inner raceway 28, so that deformation of the inner raceway 28 caused by swaging is prevented.

Figure 22:
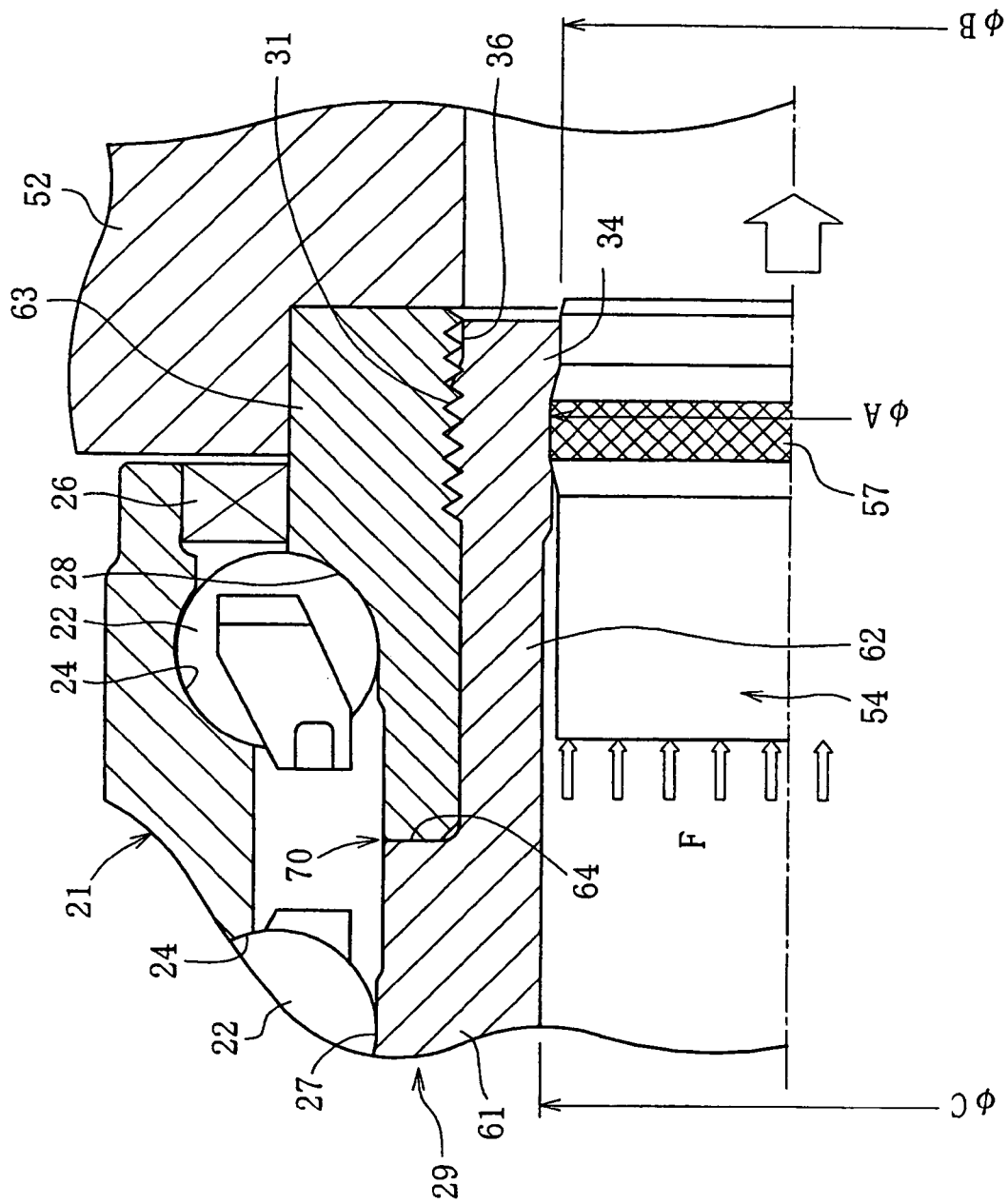
FIG. 22 is an enlarged cross sectional view of an essential part illustrating a method for manufacturing a wheel bearing device according to the invention.

As shown in FIGS. 22 and 24, an end face of one side (outboard side in this embodiment) in an axial direction of the second inner ring 63 is butted against a shoulder face 64 of the first inner ring 61 (inside-diameter side member). Here, when the swaging jig 54 inserted into the inside of the first inner ring 61 is pushed into the other side (inboard side in this embodiment) in the axial direction, the portion 34 to be swaged is pushed in toward the other side in the axial direction, and further the first inner ring 61 is pushed in toward the same direction. Then the second inner ring 63 butted in the axial direction against the first inner ring 61 is also pushed in toward the same direction. To prevent the movement of the second inner ring 63 toward the other side in the axial direction resulted from the effect described above, the end face of the other side in the axial direction of the second inner ring 63 is supported by the receive member 52.

Figure 23A:
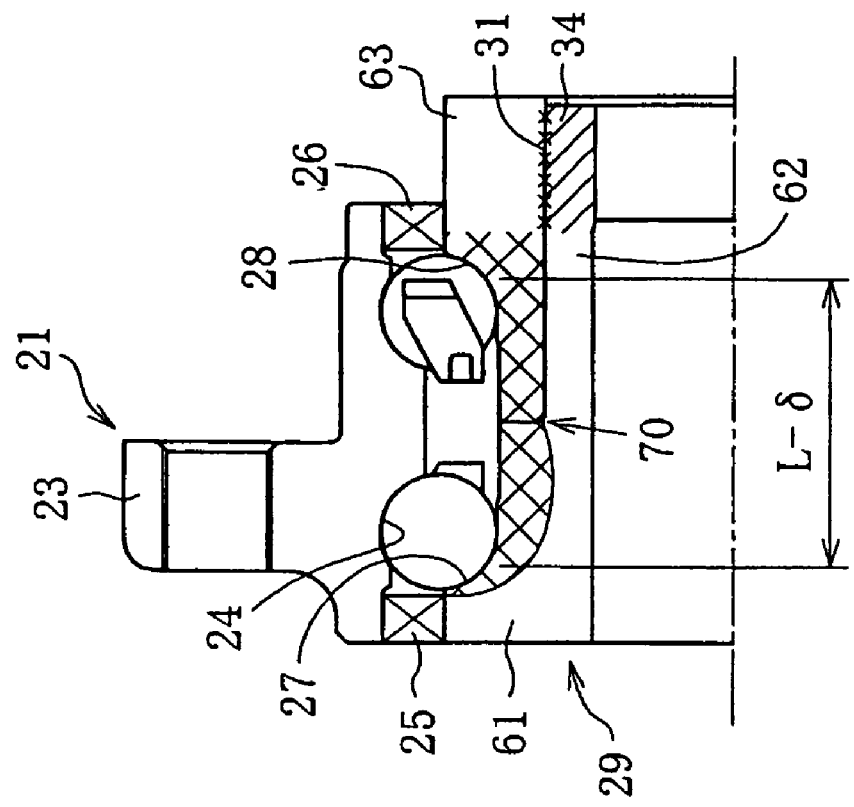
FIGS. 23(A) and 23(B) are longitudinal cross sectional views of a wheel bearing device before and after joining by swaging, respectively.
Figure 23B:
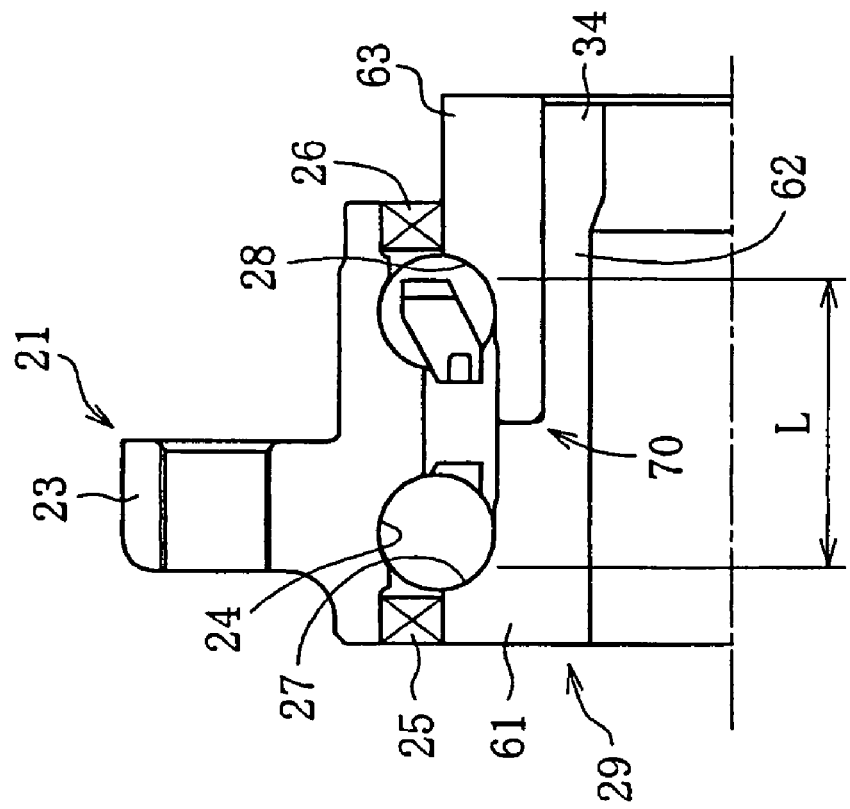

As a result of the procedure described above, a clearance between the end faces of the first inner ring 61 and second inner ring 63 is tightened at a butt portion 70 as the swaging jig 54 is pushed in, and compression strain [cross-hatched portion in FIG. 23(B)] remains at both sides of the butt portion 70 in the axial direction. Therefore, preload can be put to the bearing with an axial bearing clearance being negative. Thus it is possible to complete preload setting simultaneously when connection by swaging is completed. In this case, an amount of compression strain δ is determined by a push-in force F of the swaging jig 54, and rigidity of a portion at and around the butt portion 70 of the first inner ring 61 and second inner ring 63. Therefore, preload can be set to a most appropriate range by controlling the push-in force F.

In this swaging process, the swaging jig 54 is inserted up to an inboard opening portion from an outboard opening portion of the first inner ring 61. For this purpose, to facilitate smooth insertion of the swaging jig 54, an inside diameter φC of the first inner ring 61 in an area up to the portion 34 to be swaged must be larger than an outside diameter φA of a maximum outside-diameter portion 57 (cross-hatched in the figure, and so is the same with FIG. 10) of the swaging jig 54 (φC>φA). Further, in order to securely push the swaging jig 54 against the portion 34 to be swaged, the outside diameter φA of the maximum outside-diameter portion 57 of the swaging jig 54 must be larger than an inside diameter φB of the portion 34 to be swaged (φA>φB). Accordingly, the inside diameter φC of the first inner ring 61 excluding the portion 34 to be swaged, the outside diameter φA of the maximum outside-diameter portion 57 of the swaging jig 54, and the inside diameter φB of the portion 34 to be swaged must fulfill the relationship of φC>φA>φB.

Figure 26:
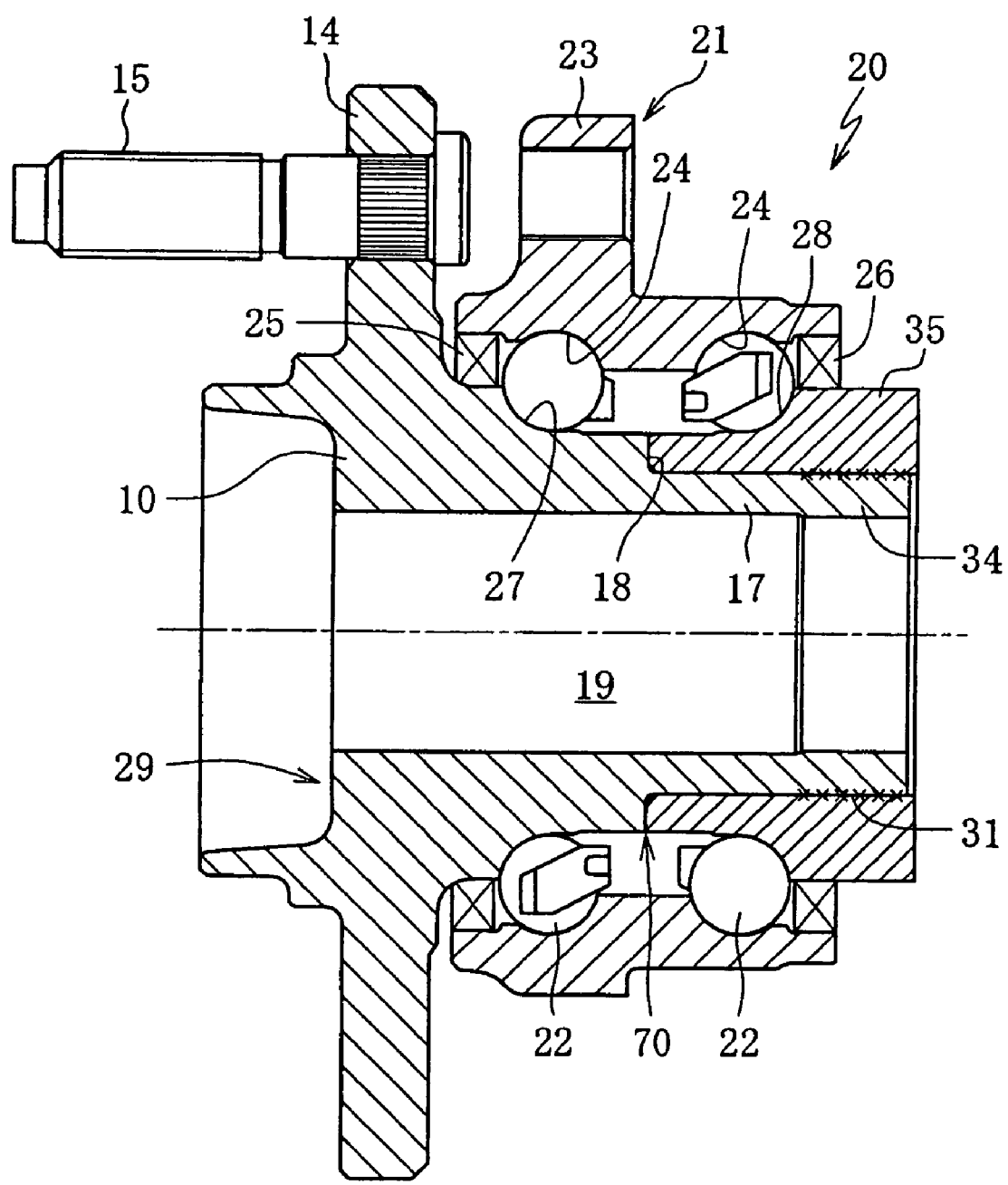
FIG. 26 is a longitudinal cross sectional view showing another example of a wheel bearing device.

FIG. 26 shows a wheel bearing device in which, same as in FIG. 8, the hub ring 10 and the bearing 20 are unitized together. In this embodiment, the portion 34 to be swaged is disposed at more inboard than the inner raceway 28, which is different from the embodiment in FIG. 8. However, other constitutions are the same as those of the embodiment in FIG. 8 and therefore, repeated descriptions are omitted. The hub ring 10 as the inside-diameter side member and the inner ring 35 as the outside-diameter side member are joined by swaging. To make the swaging, the swaging jig 54 is inserted into the hub ring 10 to expand in diameter the portion 34 to be swaged. Because an end face of one side (inboard side in this embodiment) in an axial direction of the inner ring 37 is butted against the shoulder face 18 of the hub ring 10, an appropriate amount of preload can be put to the bearing by tightening of a clearance at the butt portion 70 between the hub ring 10 and the inner ring 35. Specifically, this is done by pushing in the swaging jig 54 toward the other side in an axial direction of the inner ring 35 with an end face of the other side (inboard side) being supported by the receive member 52.

Figure 27:
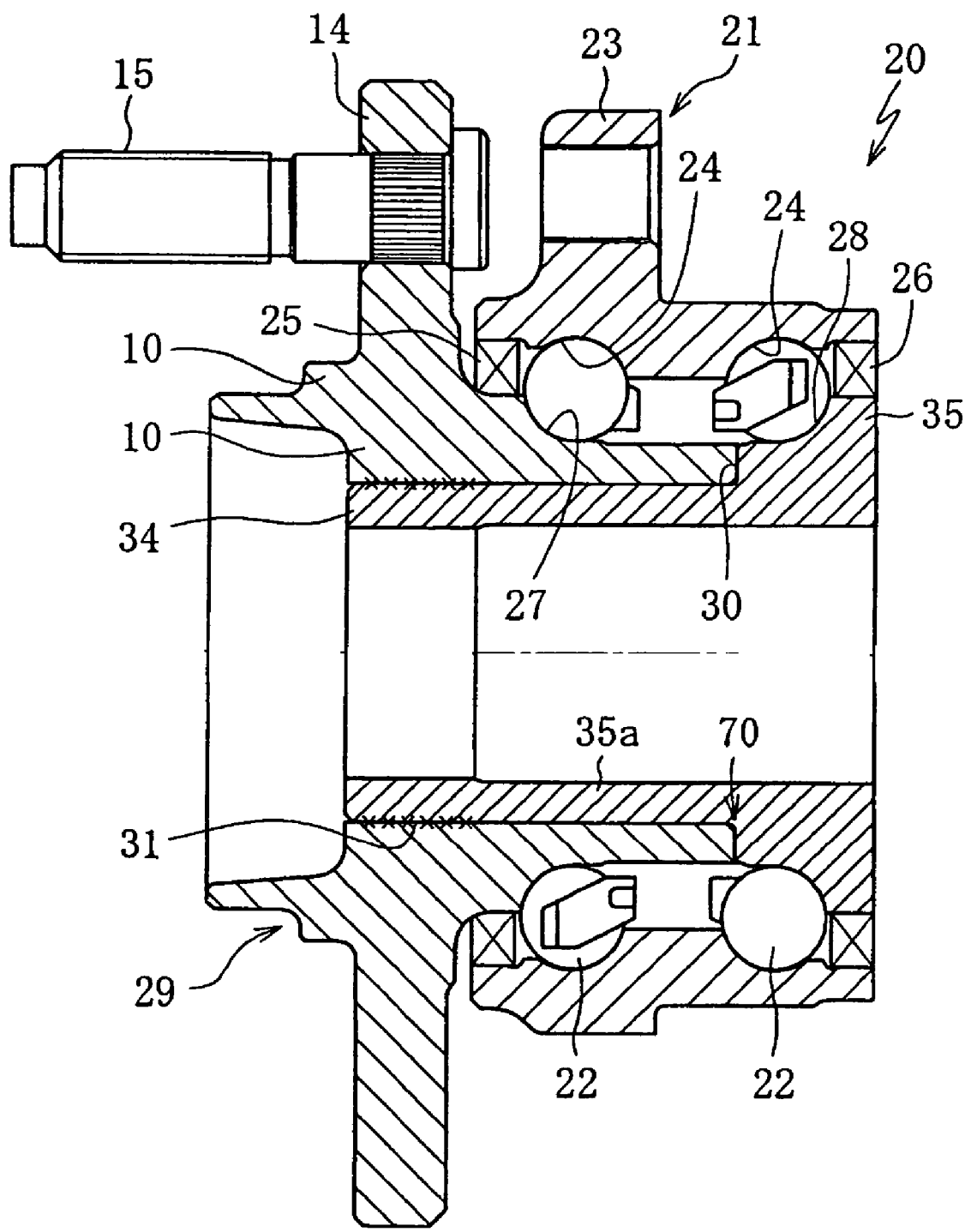
FIG. 27 is a longitudinal cross sectional view showing still another example of a wheel bearing device.

FIG. 27 shows an embodiment where, oppositely from the embodiment in FIG. 26, the hub ring 36 is fitted onto an small-diameter cylindrical portion 35a of the inner ring 35 so that the inner ring 35 is the inside-diameter side member and the hub ring 10 is the outside-diameter side member. In the same ways as above, axially one side (inboard side in this embodiment) of the hub ring 10 is butted against the shoulder face 30 of the inner ring 35, and at the same time, the swaging jig 54 is pushed into the inside of the hub ring 10 toward the axially other side of the hub ring 10 with an end face of the axially other side of the hub ring 10 being supported by the receive member 52. Then, the portion 34 to be swaged of the hub ring 10 is expanded in diameter for swaging to join it to the inner ring 35. At this time, compression strain is produced at and around the butt portion 70 between the hub ring 10 and the inner ring 35 so as to give an appropriate amount of preload to the inside of the bearing.

Figure 6:
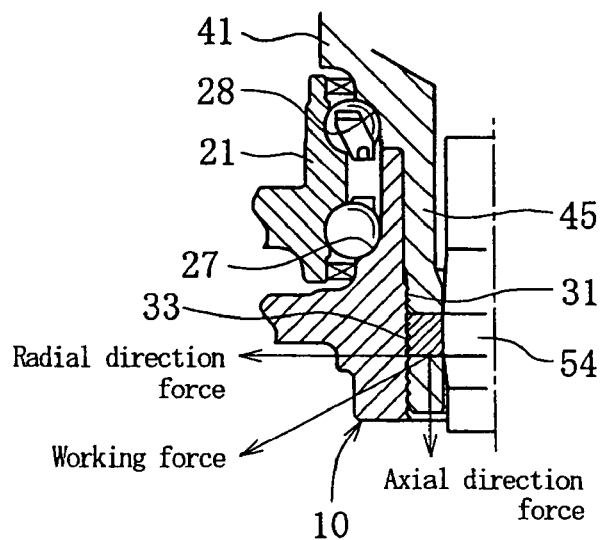
FIG. 6 is an enlarged longitudinal cross sectional view of an essential part in FIG. 5.

The swaging process described above can also be applied to a wheel bearing device (see FIGS. 1 and 7) for a driving wheel in which the hub ring 10, the bearing 20, and the constant velocity universal joint 40 are unitized together. For example, in the wheel bearing device shown in FIG. 1, axially one side (inboard side in this embodiment) of the hub ring 10 as the outside-diameter side member is butted against a shoulder face 47 of the outer joint member 41 as the inside diameter side member as shown in FIG. 5. Then, the outer joint member 41 is expanded in diameter while being pressed by the swaging jig 54 toward the axially other side with an end face of the axially other side (outboard side) of the hub ring 10 being supported by the receive member 52. In this case, preload input to the bearing because a force in the axial direction, or a force as a component of working force, acting in a direction (direction in which the inboard inner raceway 28 approaches the outboard inner raceway 27) to reduce an axial bearing clearance acts on the outer joint member 41 as shown in FIG. 6. On the other hand, in the wheel bearing device in FIG. 7, the hub ring 10 is expanded in diameter while being pressed by the swaging jig 54 toward the axially other side with a shoulder face 18 of the hub ring 10 as the inside-diameter side member being butted against axially one side (outboard side in this embodiment) of the outer joint member 41 as the outside-diameter side member and with the axially other side (inboard side) of the outer joint member 41 being supported by the receive member 52.

Figure 28:
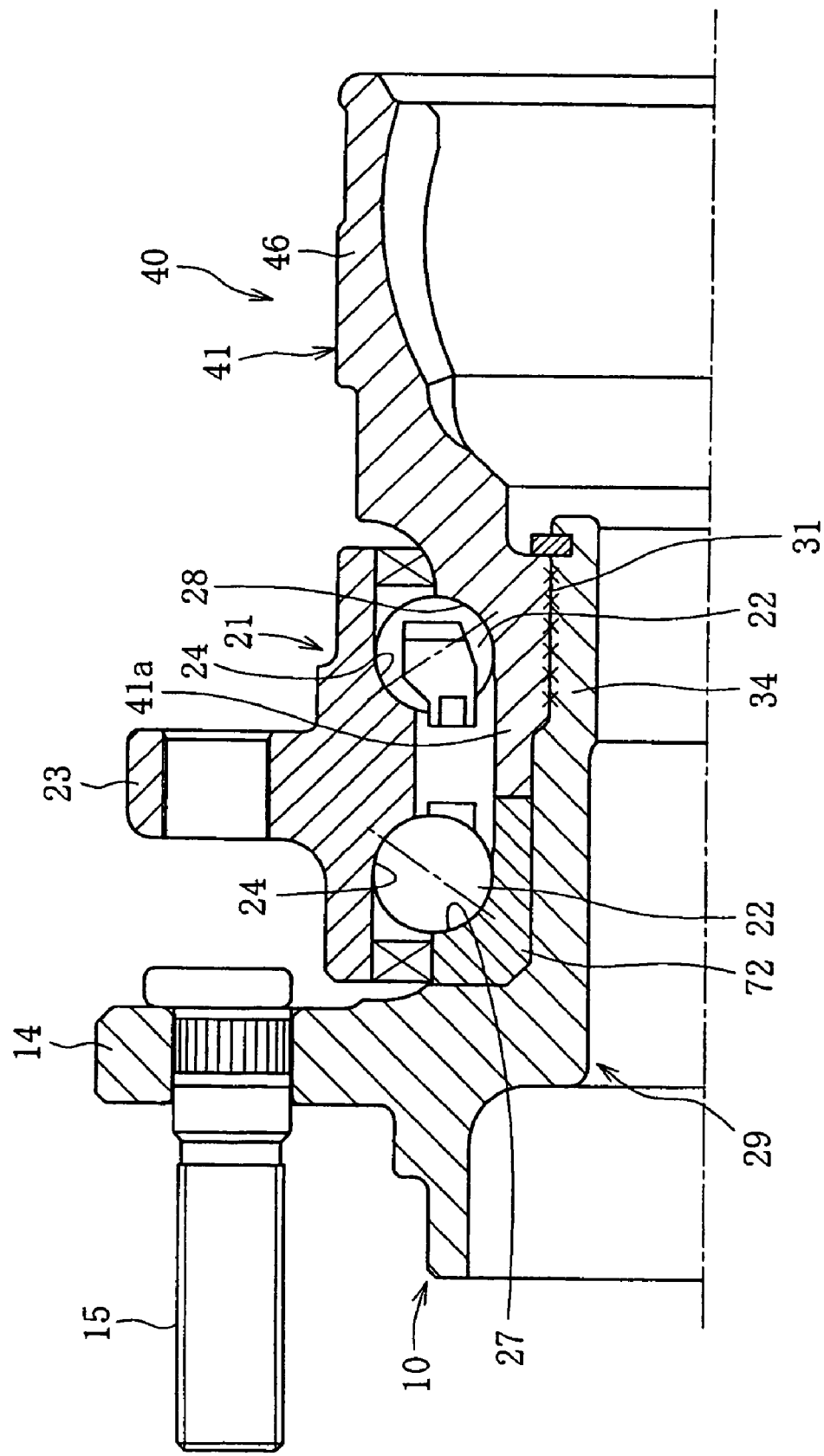
FIG. 28 is a longitudinal cross sectional view showing another example of a wheel bearing device for a driving wheel

FIG. 28 shows another embodiment of a bearing device (see FIG. 7) for a driving wheel having the outer joint member 45 fitted onto the hub ring 10, in which the inboard inner raceway 27 is formed at an member different from the hub ring 10. In this case, an inner ring 72 having the outboard inner raceway 27 is fitted onto the outside periphery of the hub ring 10, and axially one side (outboard side in this embodiment) of the outer joint member 41 as the outside-diameter side member is butted through an inner ring 72 against a face positioned in a radial direction of the hub ring 1 as the inside-diameter side member. Further, with an end face (bottom of the mouth portion 46, for example) of the axially other side (inboard side in this embodiment) of the outer joint member 41 being supported by a receive member (not shown), the swaging jig 54 is pushed toward the axially other side into the inside of the hub ring 10. Thus the swaging jig 54 is pressed against the portion 34 to be swaged, and the effect similar to that described above can be obtained.

In the embodiment in FIG. 28, the inner ring 72 having the inner raceway 27 is fitted onto the hub ring 10; however, the inner ring 72 can also be fitted onto a portion extended outboard from the cylindrical portion 41a of the outer joint member 41 (figure showing the state is omitted).

Figure 29:
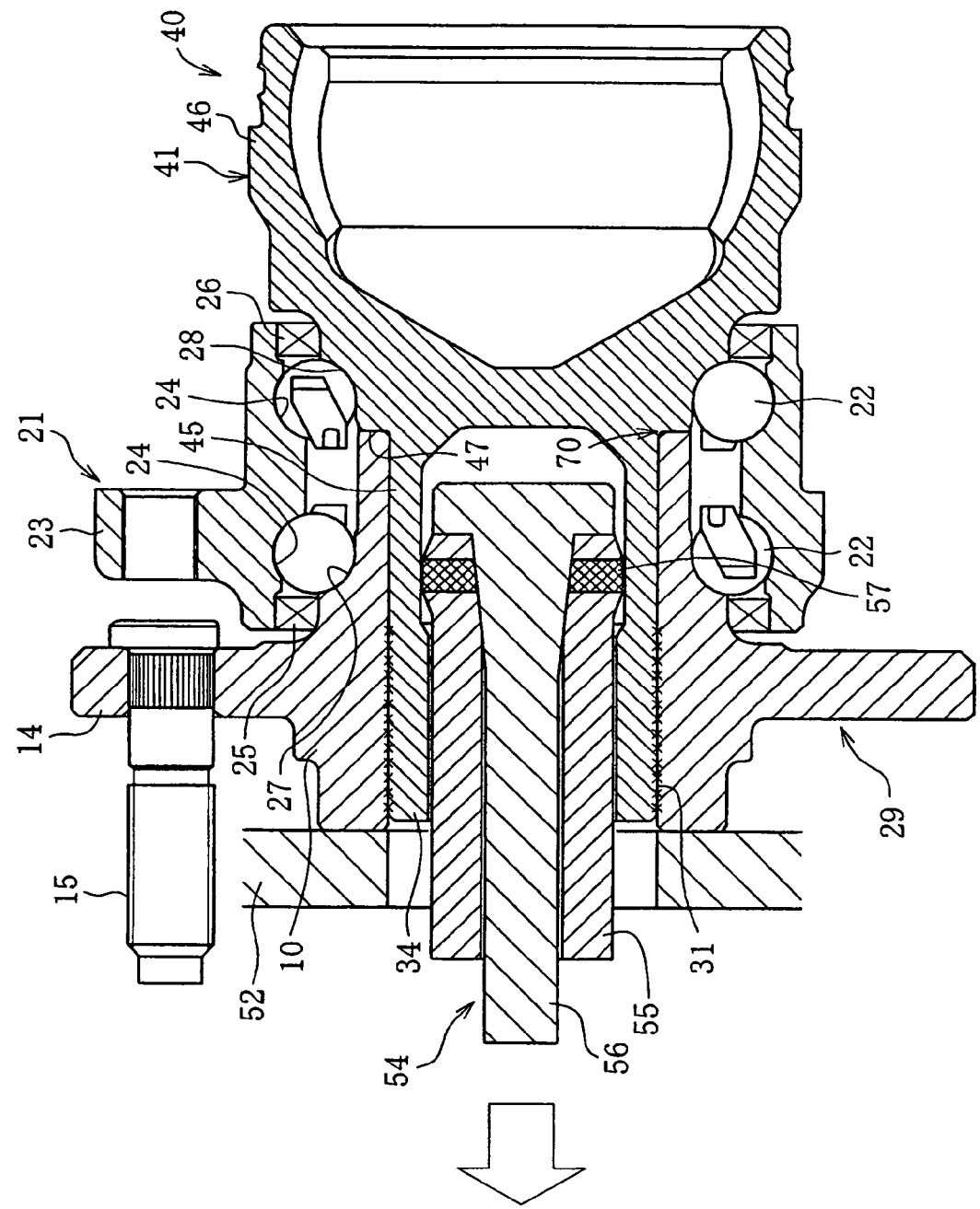
FIG. 29 is a longitudinal cross sectional view illustrating a method for manufacturing a wheel bearing device for a driving wheel.
Figure 30:
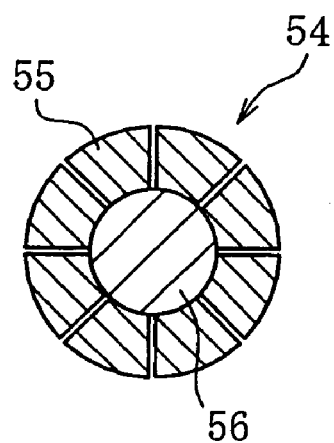
FIG. 30 is a transverse cross sectional view of a swaging jig that is constituted to be expandable and reducible in diameter.
Figure 31:
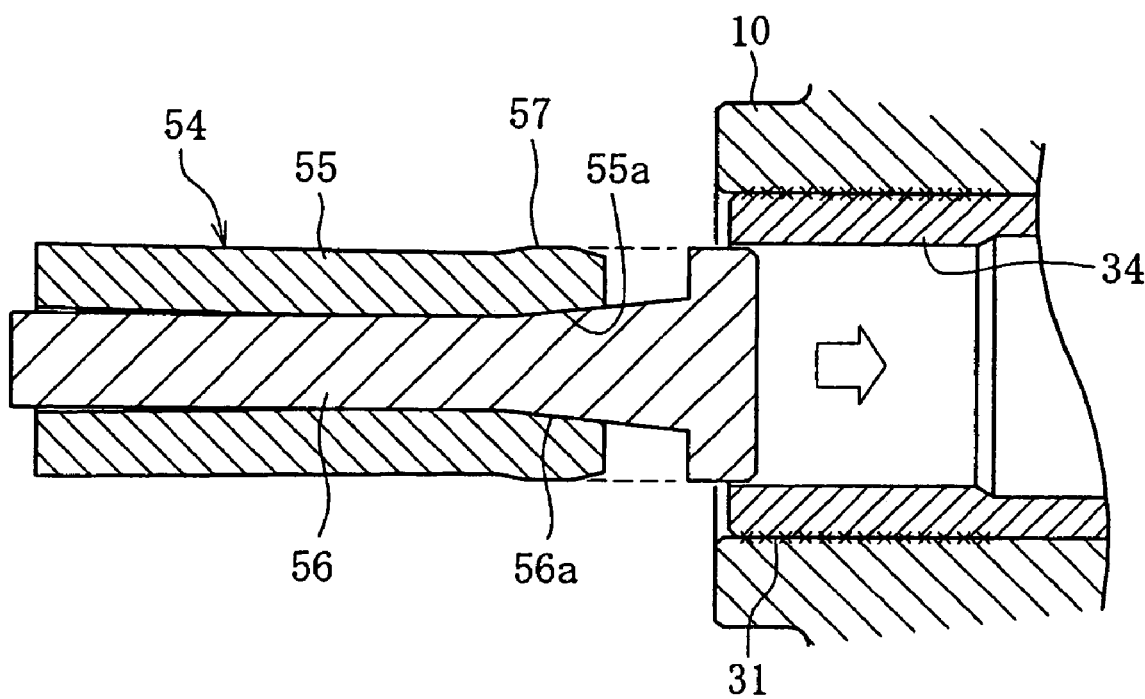
FIG. 31 is a longitudinal cross sectional view of the swaging jig shown in FIG. 30.

FIGS. 30 and 31 show another example of the swaging jig 54 that is expandable and reducible in diameter as the case shown in FIG. 12. The swaging jig 54 of this example is particularly suitable for a case where the inner member 29 is of a bottomed cylindrical shape, or for example, as shown in FIG. 29, a case where a bottom of the mouth portion 46 of the outer joint member 41 in the embodiment in FIG. 1 is closed.

This swaging jig 54 is composed of the divided punch 55 divided at a plurality of positions in a circumferential direction and the insertion member 56 slidably inserted into the inside of the divided punches 55. The divided punch 55 and the insertion member 56 are taper-fitted together through tapered faces 55a and 56a formed at the punch and the member, respectively. They are combined such that one of the tapered faces guides the other tapered face in accordance with movement in the axial direction of the insertion member, thereby the divided punch 55 is expanded or reduced in diameter. The divided punch 55 is always energized to a diameter-reduction side with means such as an elastic member.

A swaging process using this swaging jig 54 can be carried out in the procedure described below. First, the swaging jig 54 is inserted from an opening side of the inner member 29, or, in this embodiment, from an opening side of the stem portion 45 of the outer joint member 41. At this time, the swaging jig 54 is kept in a reduced-diameter state so that a diameter of the maximum outside-diameter portion 57 of the swaging jig 54 is smaller than the inside diameter of the portion 34 to be swaged provided at an opening portion of the stem portion 45. Immediately after the maximum outside-diameter portion 57 has passed the portion 34 to be swaged, the swaging jig 54 is expanded to a diameter larger than the inside diameter of the portion 34 to be swaged (FIG. 29). After that, the swaging jig 54 is drawn in a direction opposite to the insertion direction so that the maximum outside diameter portion 57 that is expanded is pressed against the portion 34 to be swaged. When the swaging jig 54 is drawn from the inside of the stem portion 45, with the effect same as above, joining by swaging between the hub ring 10 and the outer joint member 41 and preload setting by compression strain produced in the vicinity of the butt portion 70 are completed at the same time.

Described above is a case as an example in which the inner raceway 27 or 28 is provided at the outside-diameter side member. (the hub ring 10 in FIGS. 1, 5, 27, and 29, the inner ring 35 in FIGS. 8, 18, 19, and 26, the outer joint member 41 in FIGS. 5, 7, and 28, and the second inner ring 63 in FIG. 24); however, a member without an inner raceway can also be used as the outside-diameter side member.

Figure 32:
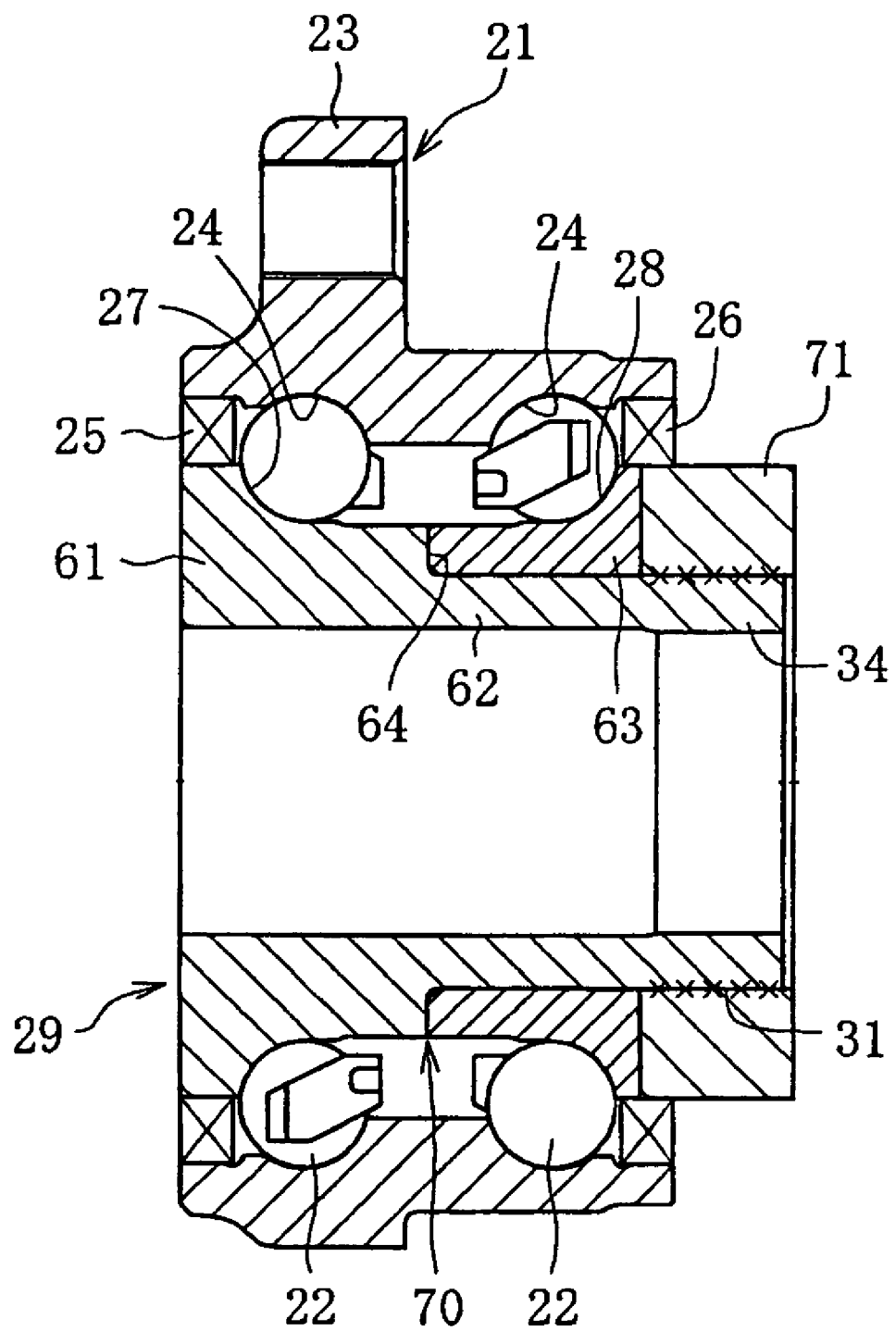
FIG. 32 is a longitudinal cross sectional view of another example of a wheel bearing device.
Figure 33:
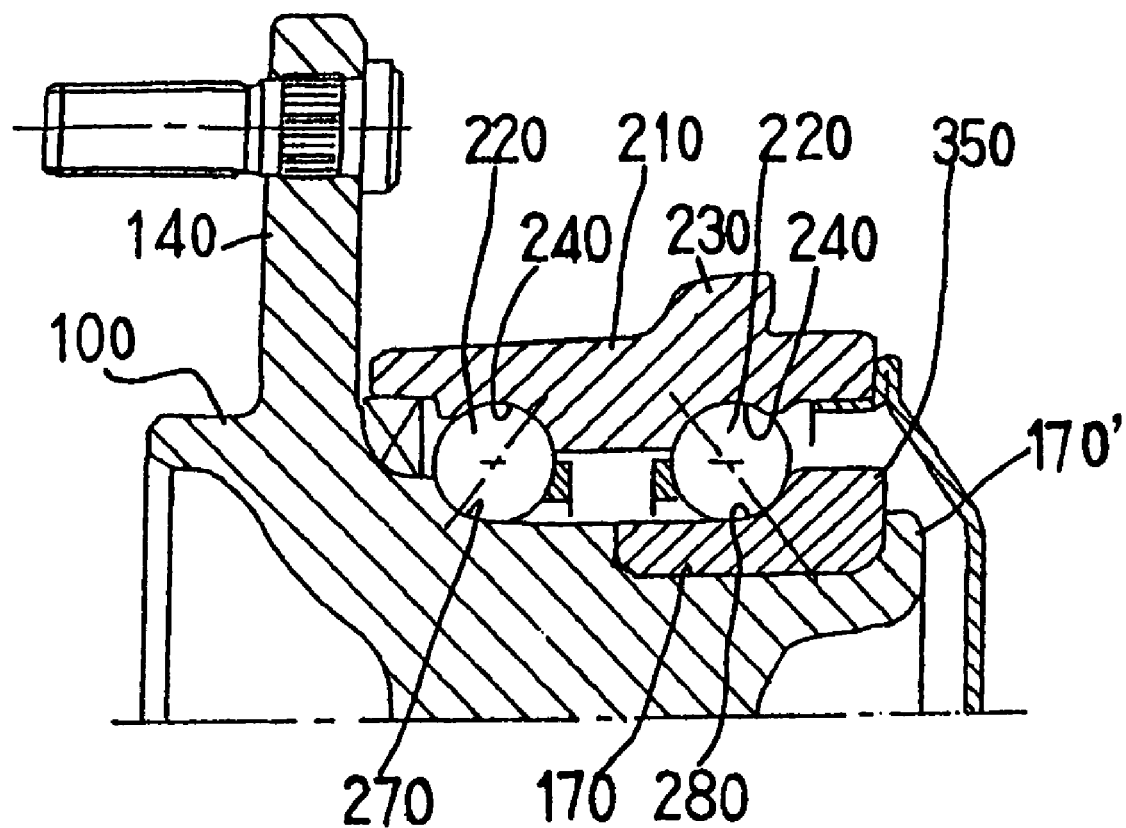
FIG. 33 is a longitudinal cross sectional view of a conventional wheel bearing device.
Figure 34:
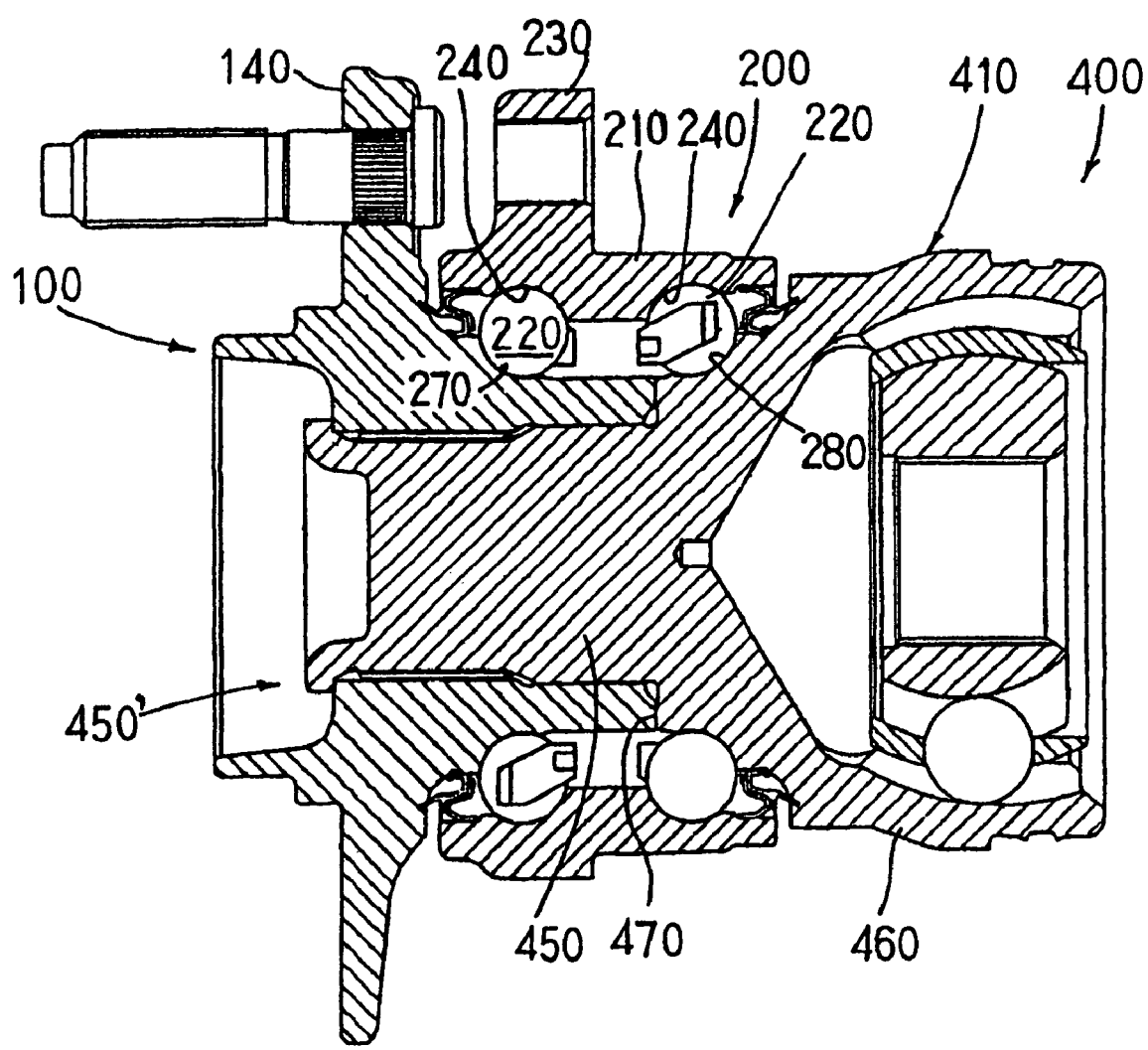
FIG. 34 is a longitudinal cross sectional view of a conventional wheel bearing device.
Figure 35:
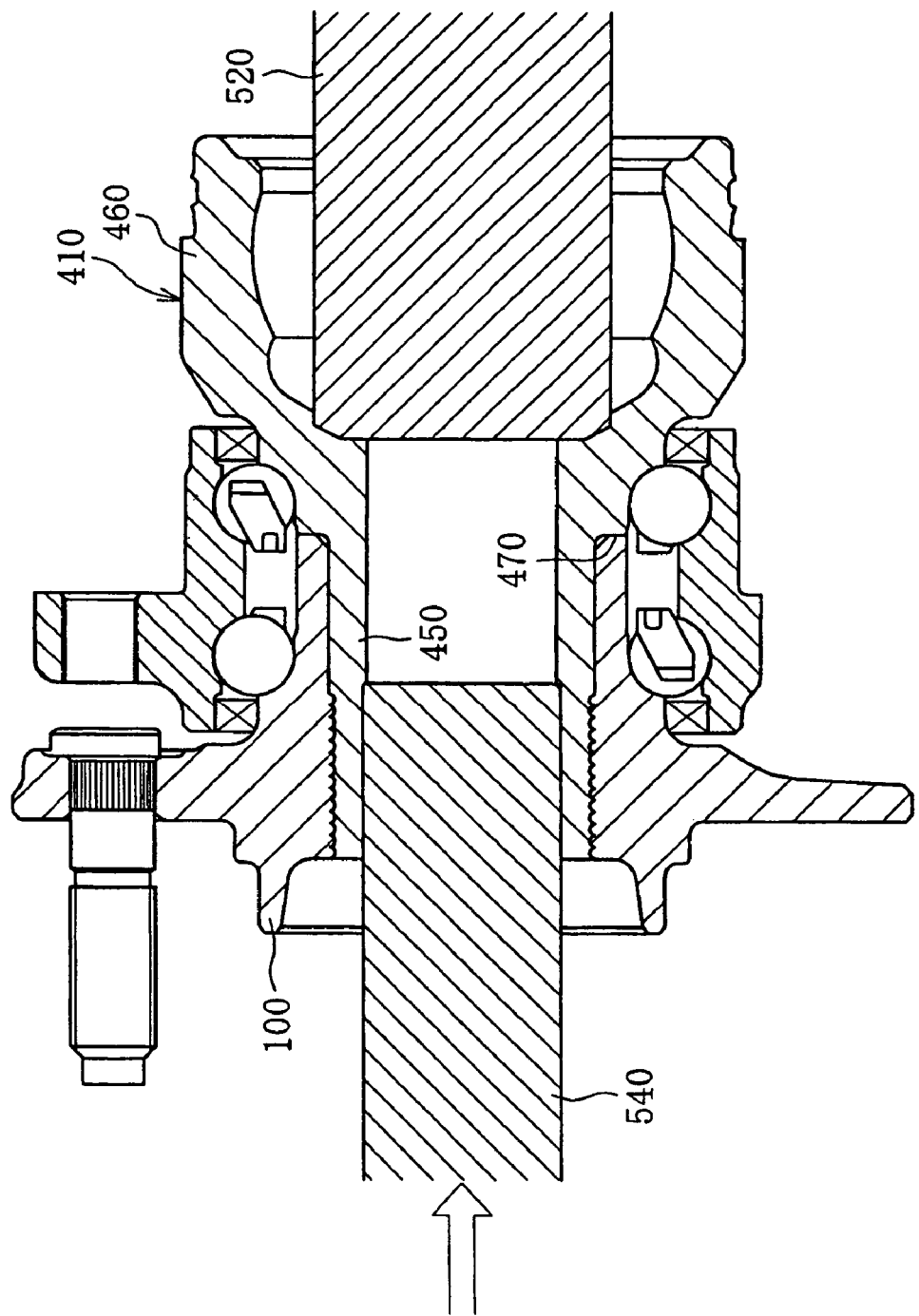
FIG. 35 is a longitudinal cross sectional view showing a conventional method of manufacturing a wheel bearing device.
Figure 36:
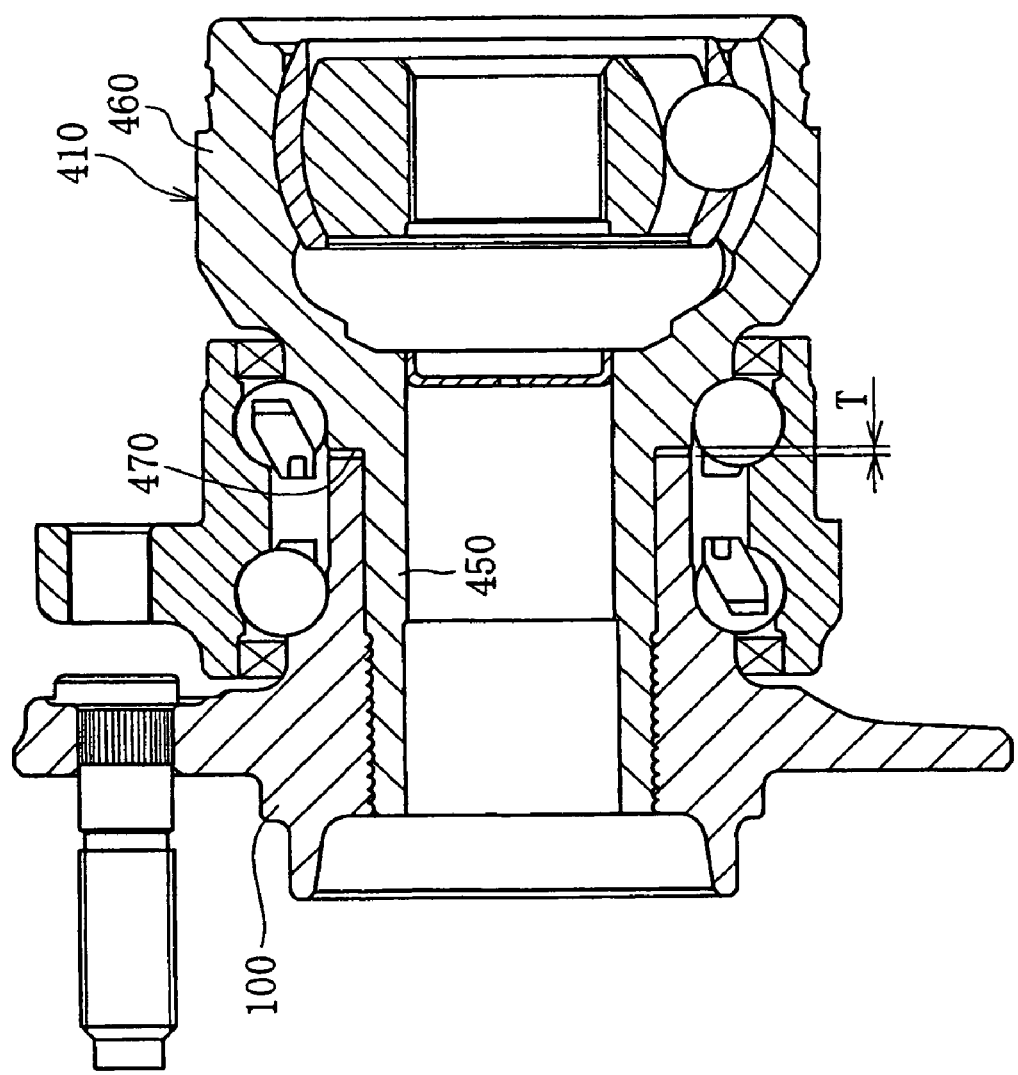
FIG. 36 is a longitudinal cross sectional view of a conventional wheel bearing device.

Such a case is shown in FIG. 32 as an example. The figure shows that a portion facing to the portion 34 to be swaged of the second inner ring 63 in the wheel bearing device according to the embodiment in FIG. 24 is separated from the second inner ring 63 as a separate member (a ring member 71). In this case as well, same as the case described above, axially one side (outboard side in this embodiment) of the ring member 71 as the outside-diameter side member is indirectly butted against the first inner ring 61 (inside-diameter side member) through the second inner ring 63. Further, the portion 34 to be swaged of the first inner ring 61 is expanded in diameter while being pressed by the swaging jig 54 toward the axially other side with the axially other side (inboard side) of the ring member 71 being supported by a support member (not shown). Thereby the joining by swaging of the inner ring 61 to the ring member 71 and preload setting are made at the same time. In this case, deformation of the inner raceway 28 caused by swaging can be securely prevented, because the inboard inner raceway 28 is formed on a separate member from the outside-diameter side member (the ring member 71).

In a wheel bearing device according to the invention, since a low hardness portion is expanded in diameter to make a hardened irregular portion bite into the low hardness portion, a solid joining is achieved at the fit portion between an inside-diameter side member and an outside-diameter side member for preventing loosening of the joining between both the members. Further, a low hardness portion having a hardness lower than that of the irregular portion is provided at an inside-diameter side member that is a separate member from an outside-diameter side member having the irregular portion. It is arranged such that this low hardness portion is expanded in diameter, so that the irregular portion can be sufficiently hardened while a large expansion allowance is secured at the low hardness portion and swaging cracks are prevented from being produced. Accordingly, the low hardness portion can be made to deeply bite into the irregular portion to firmly join both the members together.

Further, according to the invention, preload can be put to the inside of the bearing with an axial bearing clearance being negative simultaneously when the joining by swaging of the inside-diameter side member and the outside-diameter side member is completed. Also, preload control is facilitated because an appropriate amount of preload can be given only by the control of force applied by the swaging jig.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A method of manufacturing a wheel bearing device, the device comprising: an outer member having outer raceways in double rows at its inside periphery; an inner member having inner raceways in double rows facing to the outer raceways, an inside-diameter side member, and an outside-diameter side member fitted onto the inside-diameter side member with an irregular portion interposed in between; rolling members in double rows disposed between the outer raceways and the inner raceways, wherein when the inside-diameter side member and the outside-diameter side member are joined together by swaging through expansion of at least a part of the inside-diameter side member by a swaging jig pushed into an inside of the inside-diameter side member to make the irregular portion bite into an opposing face, the inside-diameter side member is expanded in diameter while being pressed by the swaging jig toward axially one side with the inside-diameter side member being made to axially butt against the other side of the outside-diameter side member and the outside-diameter side member at the axially one side being supported by a receive member, wherein a compression strain remains at and around portions of the inside-diameter side member butting against portions of the outside-diameter side member.

2. The method for manufacturing a wheel bearing device according to claim 1, wherein an outside diameter $\phi A$ of the swaging jig, an inside diameter $\phi B$ of a portion to be swaged out of portions of the inside-diameter side member, an inside diameter $\phi C$ of the inside-diameter side member excluding the portion are set to the relationship of $\phi C > \phi A > \phi B$.

3. The method of manufacturing a wheel bearing device according to claim 1, wherein the swaging jig having a diameter reduced to a dimension smaller than an inside diameter of the portion to be swaged is inserted into an inside of the inside-diameter side member, and, at a position where the swaging jig has passed the portion to be swaged, the swaging jig is expanded in diameter to a dimension that is larger than the inside diameter of the portion to be swaged, and then is drawn out in a direction opposite to the insertion of the jig.

4. The method of manufacturing a wheel bearing device according to claim 3, wherein the swaging jig is such that a divided punch divided in a circumferential direction and an insertion member slideably inserted into the inside of the divided punch are taper-fitted together.

5. The method of manufacturing a wheel bearing device according to claim 1, wherein the inside-diameter side member is joined by swaging to the outside-diameter side member provided with the inner raceways.

6. The method of manufacturing a wheel bearing device according to claim 2, wherein the inside-diameter side member is joined by swaging to the outside-diameter side member provided with the inner raceways.

7. The method of manufacturing a wheel bearing device according to claim 3, wherein the inside-diameter side member is joined by swaging to the outside-diameter side member provided with the inner raceways.

8. The method of manufacturing a wheel bearing device according to claim 4, wherein the inside-diameter side member is joined by swaging to the outside-diameter side member provided with the inner raceways.

9. The method of manufacturing a wheel bearing device according to claim 1, wherein the inside-diameter side member is joined by swaging to the outside-diameter side member that is not provided with inner raceways.

10. The method of manufacturing a wheel bearing device according to claim 2, wherein the inside-diameter side member is joined by swaging to the outside-diameter side member that is not provided with inner raceways.

11. The method of manufacturing a wheel bearing device according to claim 3, wherein the inside-diameter side member is joined by swaging to the outside-diameter side member that is not provided with inner raceways.

12. The method of manufacturing a wheel bearing device according to claim 4, wherein the inside-diameter side member is joined by swaging to the outside-diameter side member that is not provided with inner raceways.

* * * * *